(12) United States Patent
Li et al.

(10) Patent No.: US 11,122,527 B2
(45) Date of Patent: Sep. 14, 2021

(54) METHOD AND APPARATUS FOR PERFORMING DATA TRANSMISSION BASED ON MULTIPLE TRANSMISSION TIME INTERVALS, FOR TRANSMITTING CONTROL INFORMATION, AND FOR TRANSMITTING DATA BY EMPLOYING MULTIPLE PORTS

(71) Applicant: Samsung Electronics Co., Ltd., Suwon-si (KR)

(72) Inventors: Yingyang Li, Beijing (CN); Yi Wang, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/494,944

(22) PCT Filed: Mar. 26, 2018

(86) PCT No.: PCT/KR2018/003526
§ 371 (c)(1),
(2) Date: Sep. 17, 2019

(87) PCT Pub. No.: WO2018/174677
PCT Pub. Date: Sep. 27, 2018

(65) Prior Publication Data
US 2020/0015176 A1 Jan. 9, 2020

(30) Foreign Application Priority Data
Mar. 24, 2017 (CN) .......................... 201710184583.1
Apr. 28, 2017 (CN) .......................... 201710294132.3
(Continued)

(51) Int. Cl.
*H04W 52/52* (2009.01)
*H04L 5/00* (2006.01)
(Continued)

(52) U.S. Cl.
CPC .......... *H04W 52/52* (2013.01); *H04L 1/0038* (2013.01); *H04L 1/1819* (2013.01);
(Continued)

(58) Field of Classification Search
None
See application file for complete search history.

(56) References Cited

U.S. PATENT DOCUMENTS

2011/0164489 A1 7/2011 Papasakellariou et al.
2015/0117353 A1 4/2015 Takeda et al.
(Continued)

OTHER PUBLICATIONS

LG Electronics; Discussion on NR-PUCCH resource allocation; 3GPP TSG RAN WG1 Meeting #88; R1-1702483; Feb. 13-17, 2017; Athens, Greece.
(Continued)

*Primary Examiner* — Saad Khawar
(74) *Attorney, Agent, or Firm* — Jefferson IP Law, LLP

(57) ABSTRACT

The disclosure relates to a pre-5th-Generation (5G) or 5G communication system to be provided for supporting higher data rates beyond 4th-generation (4G) communication system such as long term evolution (LTE). A method for operating a terminal is provided. The method includes detecting, scheduling assignment (SA) of another terminal in a sensing window based on transmission time intervals (TTIs) with different lengths in a resource pool; detecting a receiving power of a scheduled data channel based on the SA and a receiving energy of each sub-channel of each subframe; determining resources for data transmission based
(Continued)

on the SA, the receiving power and the receiving energy; and transmitting data on the resources.

12 Claims, 13 Drawing Sheets

(30) Foreign Application Priority Data

| May 5, 2017 | (CN) | ......................... 201710313590.7 |
| May 12, 2017 | (CN) | ......................... 201710334840.5 |
| Jun. 15, 2017 | (CN) | ......................... 201710454748.2 |

(51) Int. Cl.
    *H04L 27/00*     (2006.01)
    *H04W 72/02*     (2009.01)
    *H04L 5/10*     (2006.01)
    *H04W 72/04*     (2009.01)
    *H04L 1/00*     (2006.01)
    *H04L 1/18*     (2006.01)

(52) U.S. Cl.
    CPC .......... *H04L 5/0044* (2013.01); *H04L 5/0051* (2013.01); *H04L 5/0055* (2013.01); *H04L 5/0082* (2013.01); *H04L 5/0092* (2013.01); *H04L 5/10* (2013.01); *H04L 27/0006* (2013.01); *H04W 72/02* (2013.01); *H04W 72/0406* (2013.01)

(56) References Cited

U.S. PATENT DOCUMENTS

| 2015/0305058 | A1 | 10/2015 | Hammarwall et al. |
| 2015/0334760 | A1* | 11/2015 | Sartori .................... H04L 43/08 370/329 |
| 2016/0295584 | A1* | 10/2016 | Chen ..................... H04L 5/0053 |
| 2018/0176043 | A1* | 6/2018 | Kim ....................... H04L 5/0048 |
| 2019/0320447 | A1* | 10/2019 | Blasco Serrano .... H04L 5/0082 |
| 2020/0068534 | A1* | 2/2020 | Li ......................... H04W 72/12 |

OTHER PUBLICATIONS

NTT DOCOMO, Inc.; Study on New Radio Access Technology; 3GPP TSG RAN meeting #75; RP-170376; Mar. 6-9, 2017; Dubrovnik, Croatia.

* cited by examiner

[Fig. 1]
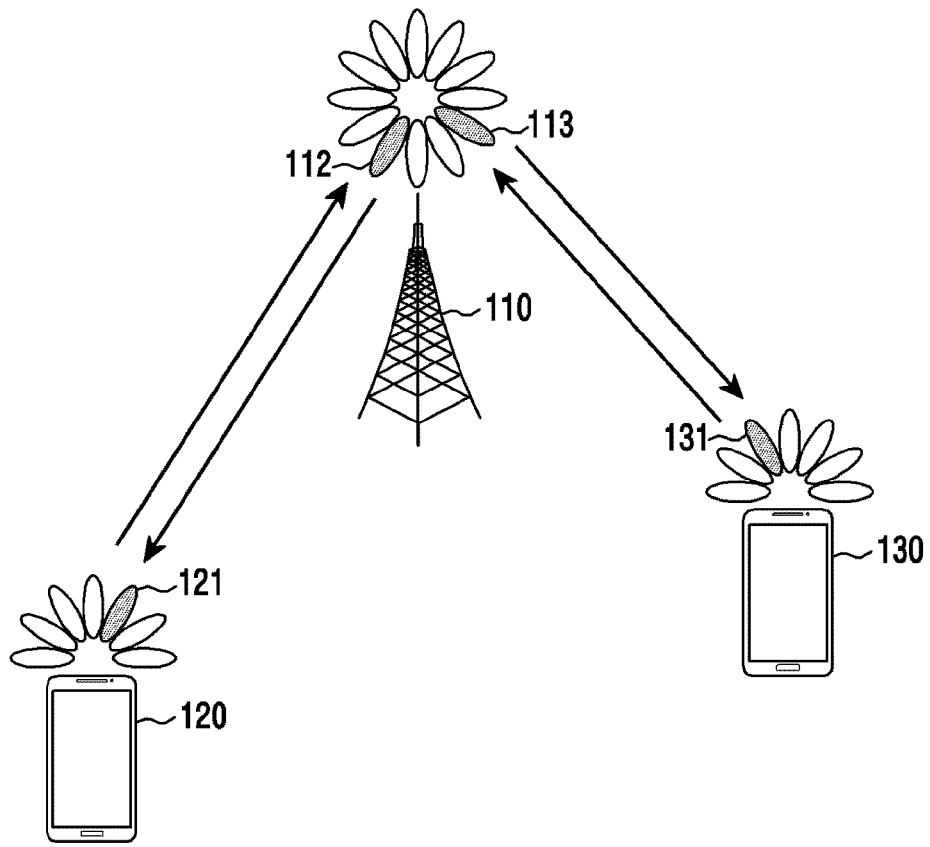
[Fig. 2]
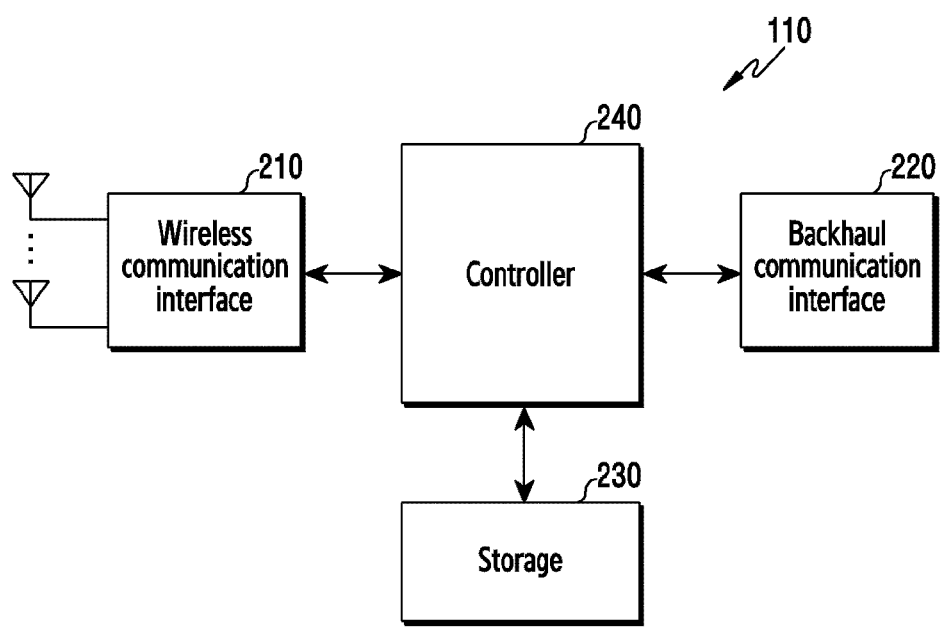

[Fig. 3]
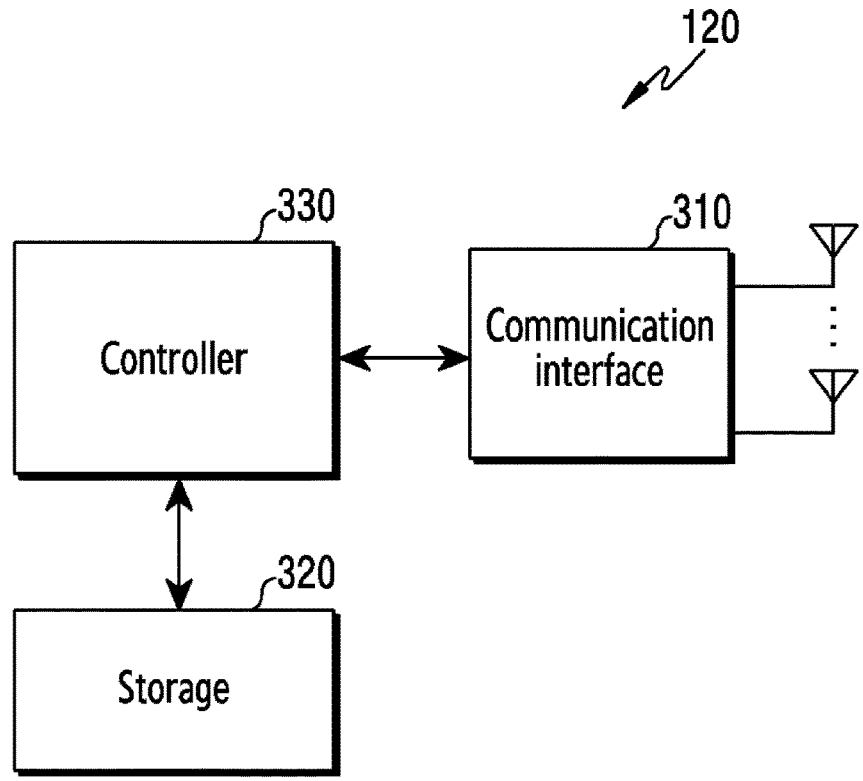
[Fig. 4]
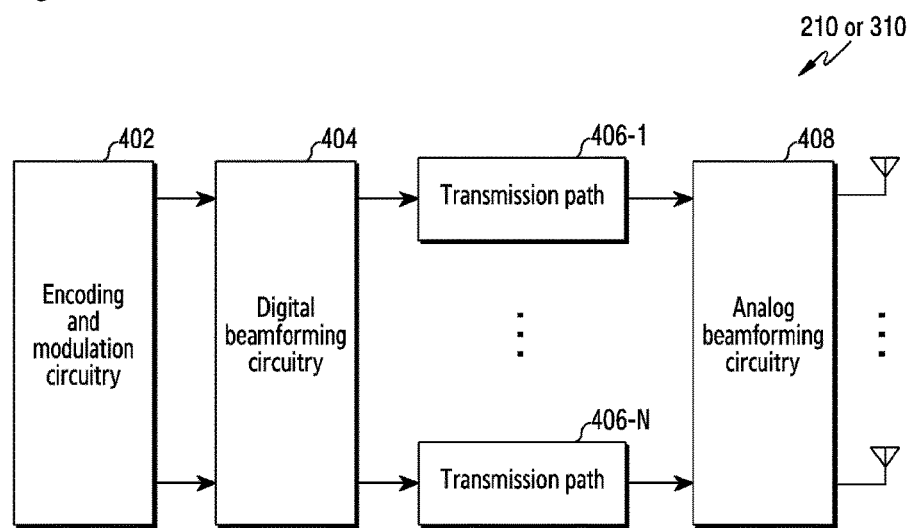
[Fig. 5]
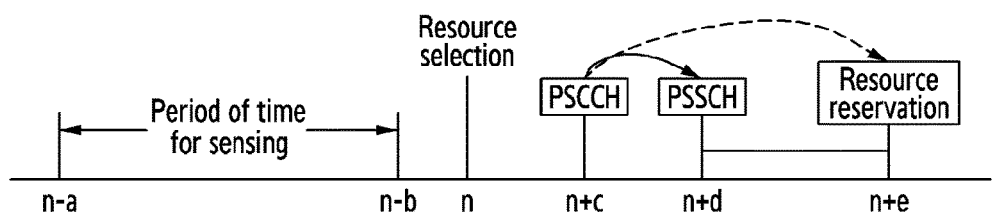

[Fig. 6]
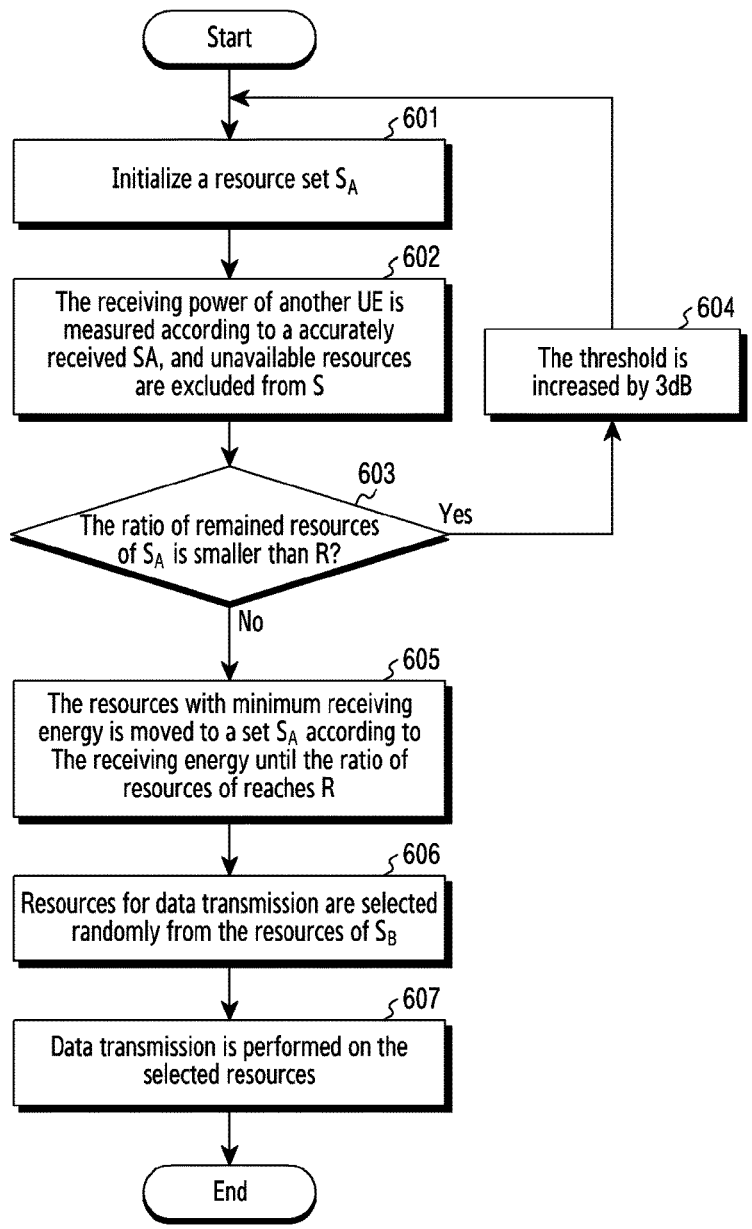

[Fig. 7]
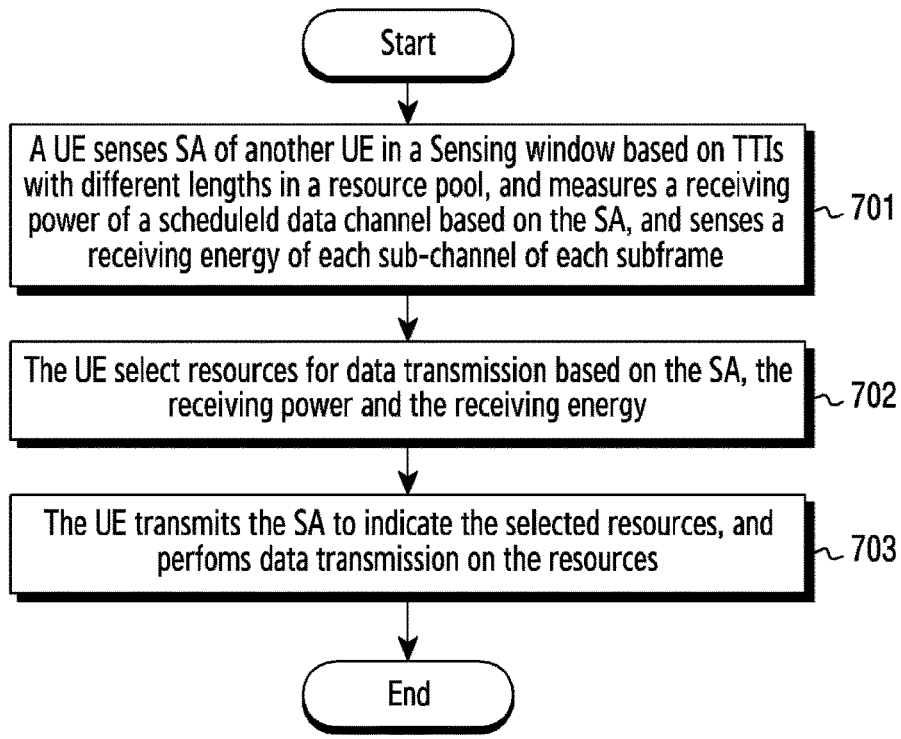
[Fig. 8]
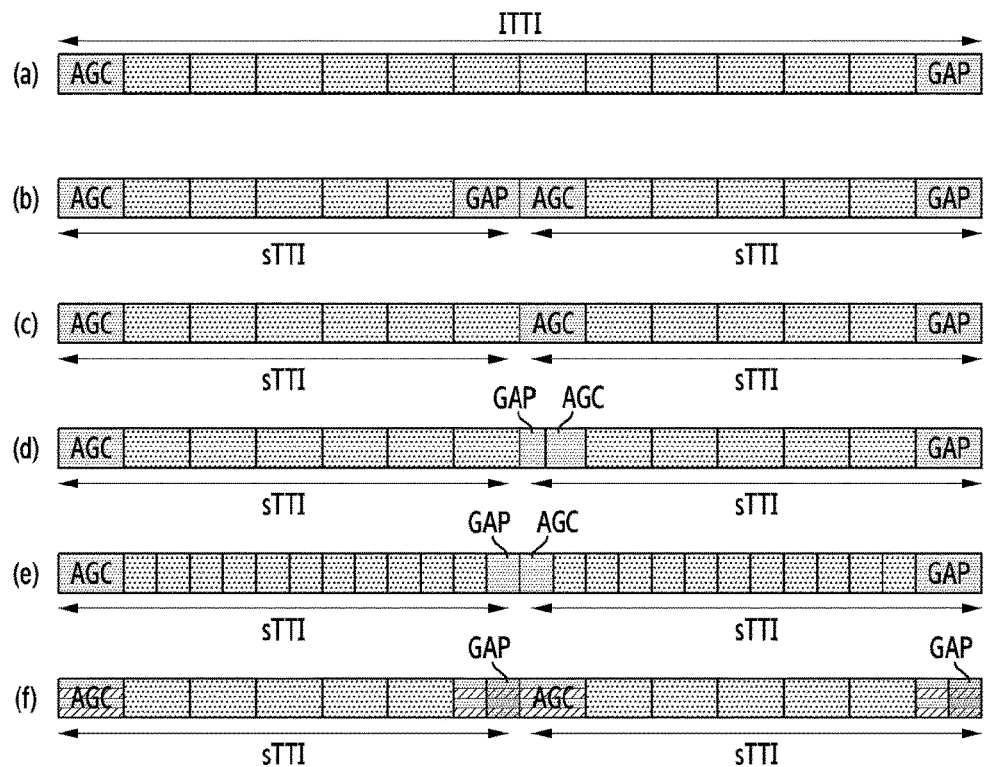

[Fig. 9]
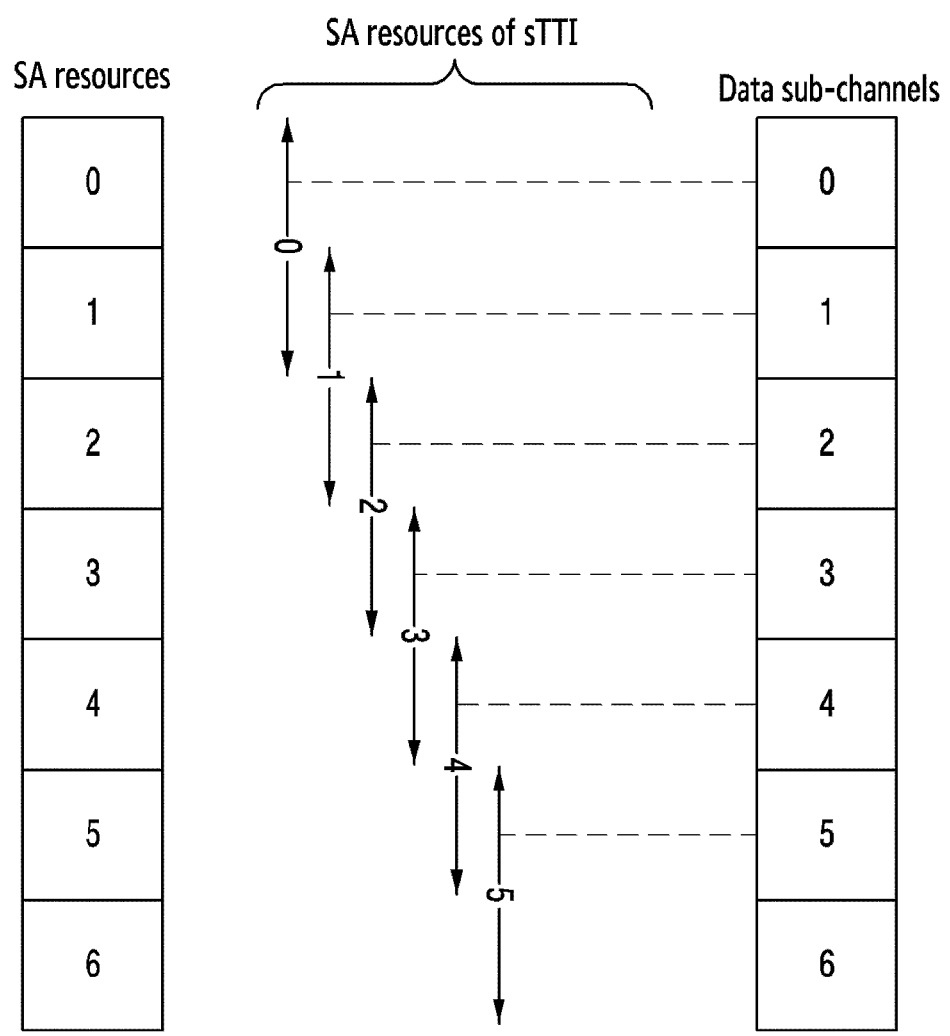

[Fig. 10]
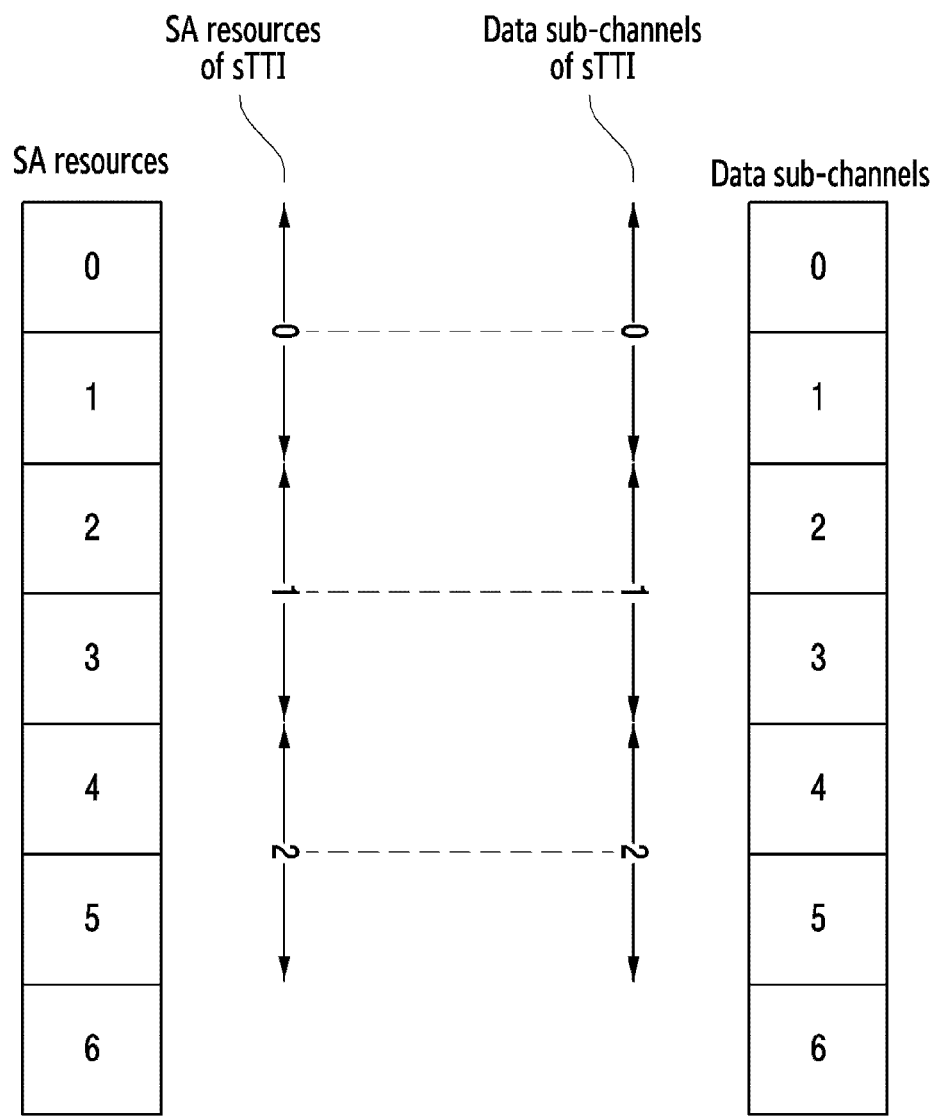

[Fig. 11]
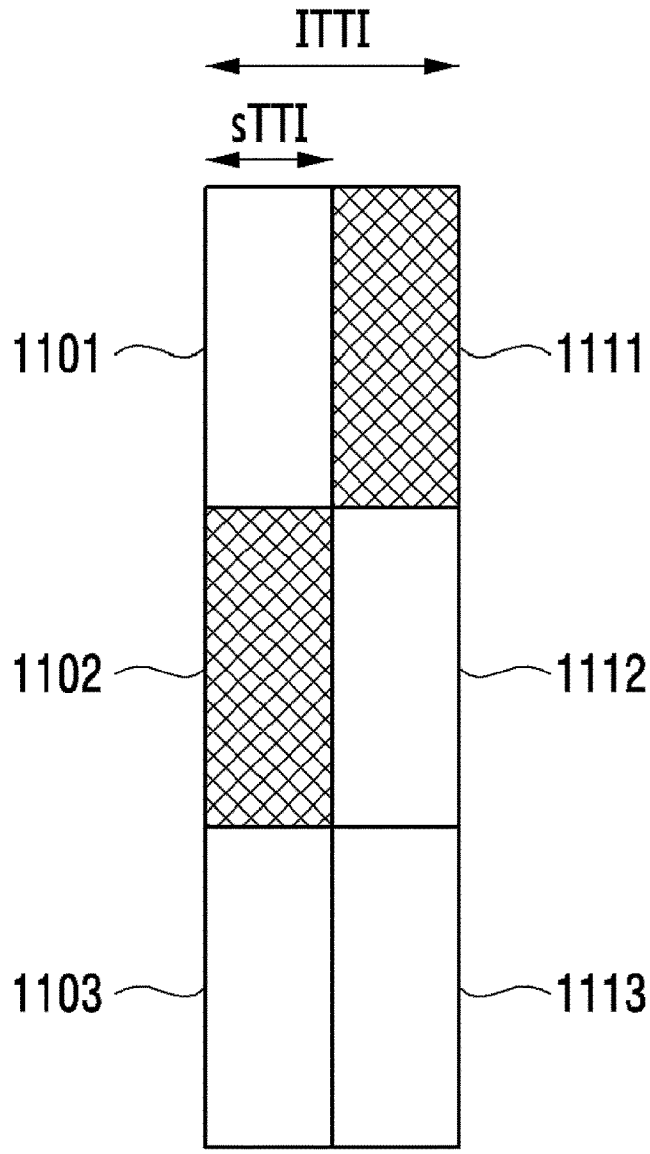
[Fig. 12]
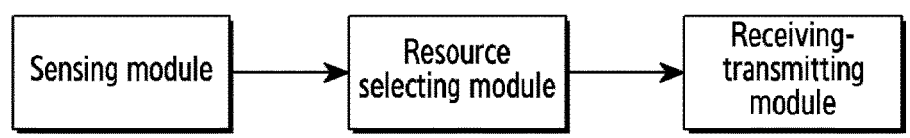
[Fig. 13]
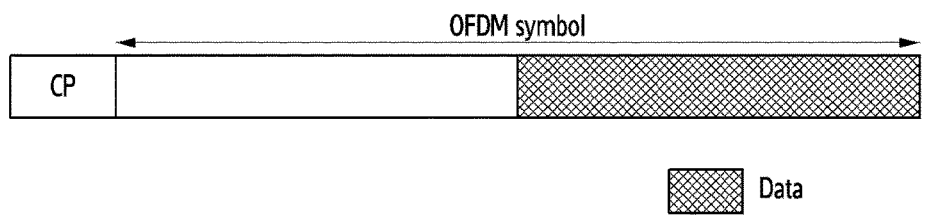

[Fig. 14]
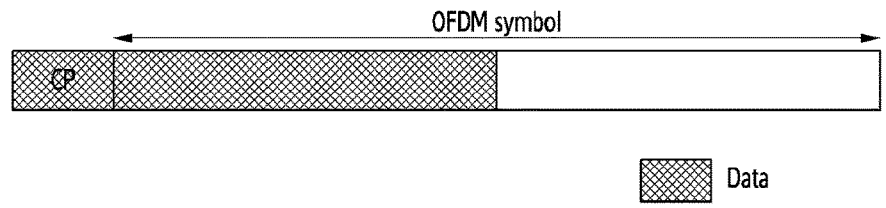
[Fig. 15]
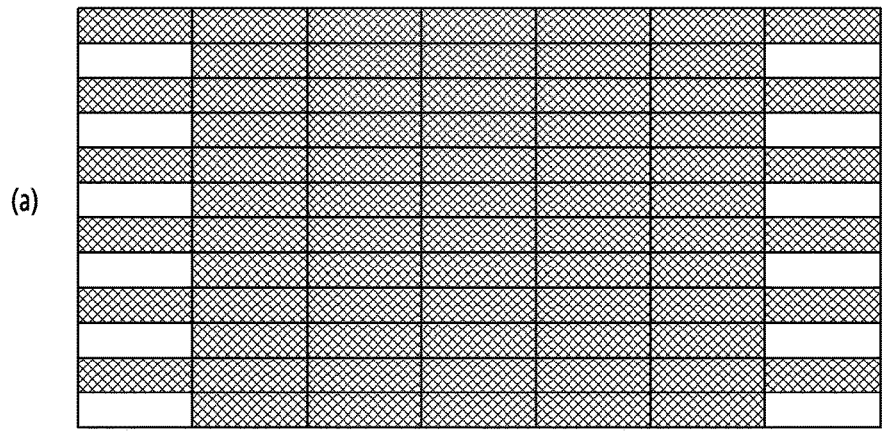
[Fig. 16]
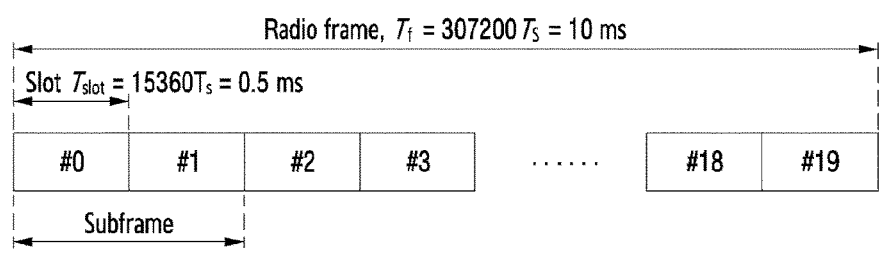

[Fig. 17]
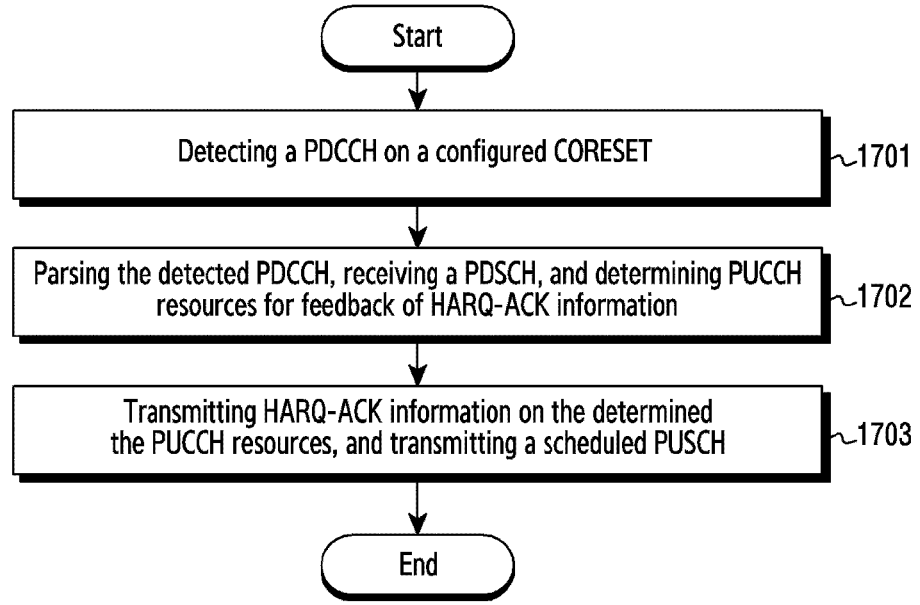
[Fig. 18]
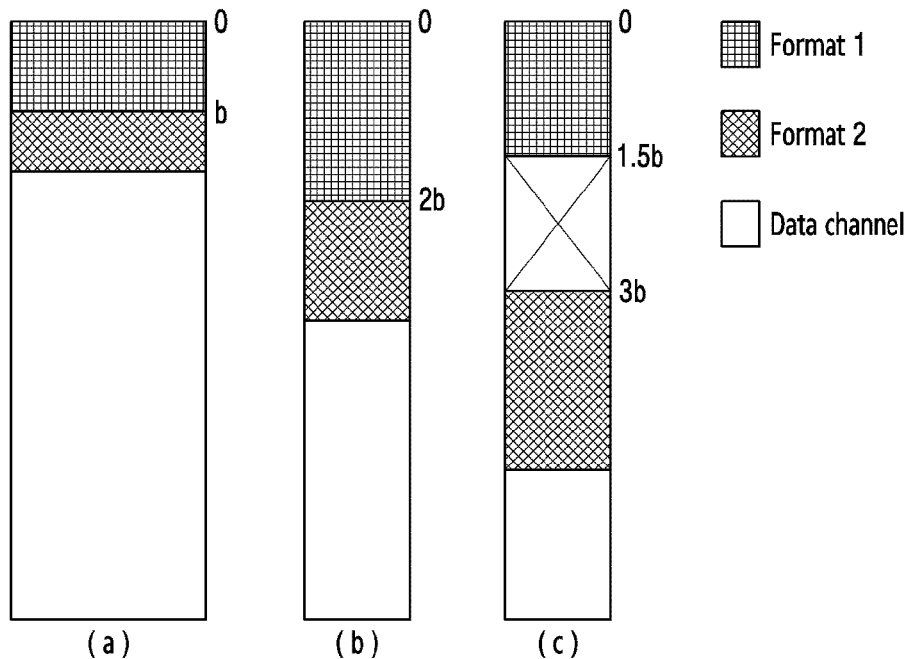

[Fig. 19]
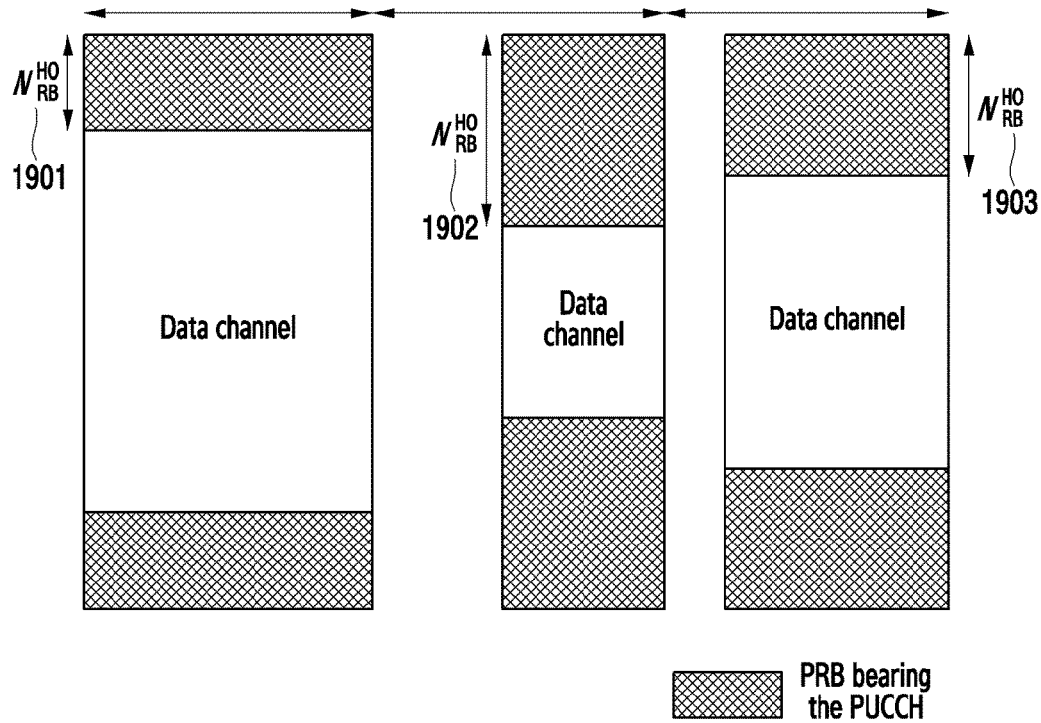
[Fig. 20]
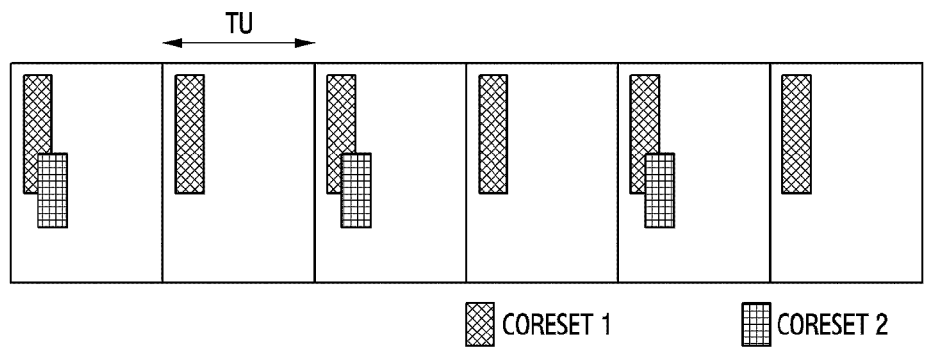
[Fig. 21]
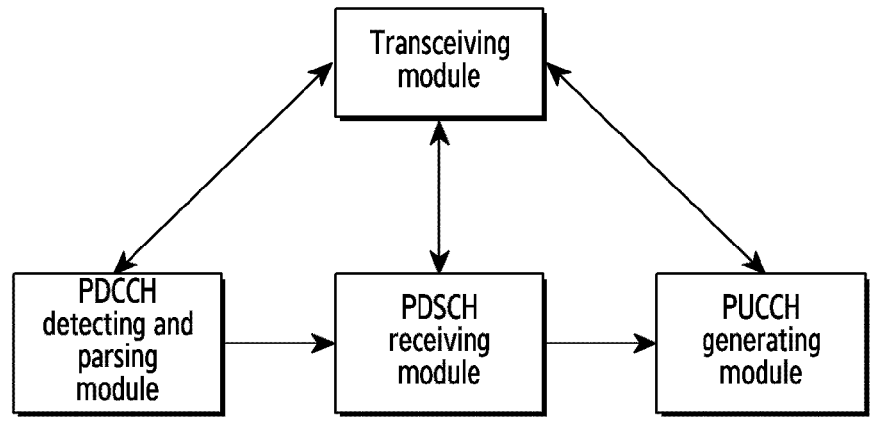

[Fig. 22]
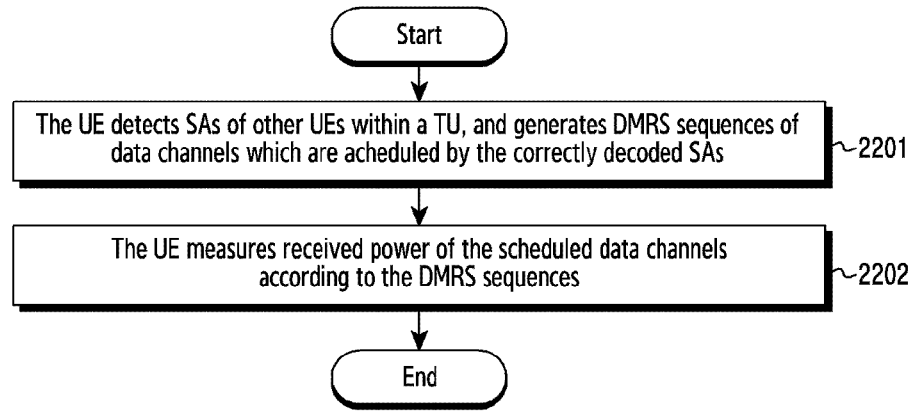
[Fig. 23]
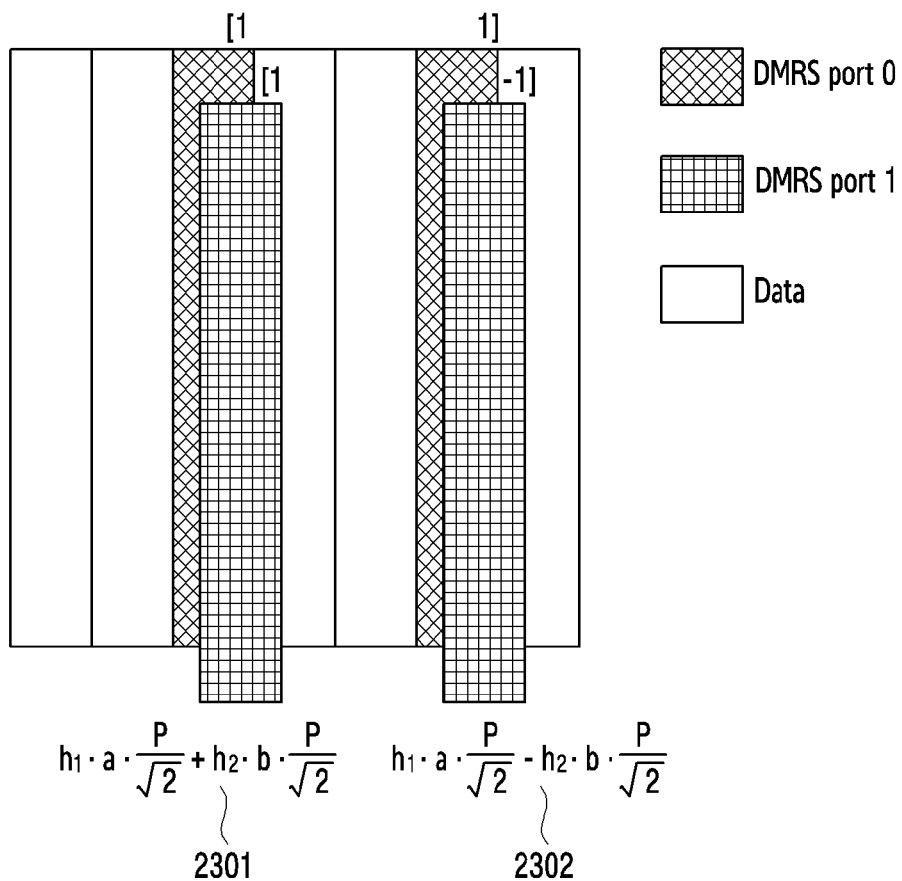

[Fig. 24]
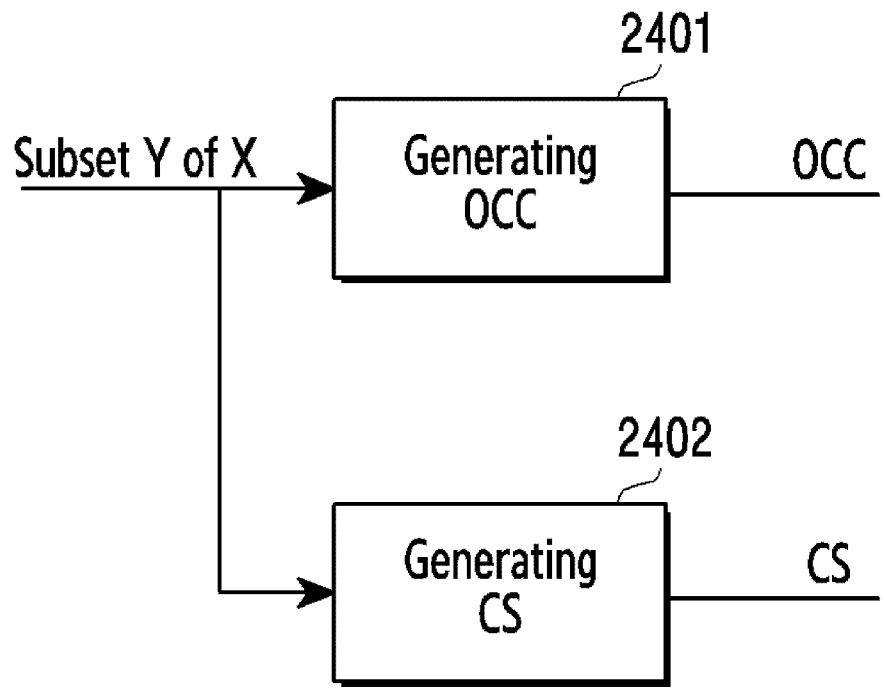
[Fig. 25]
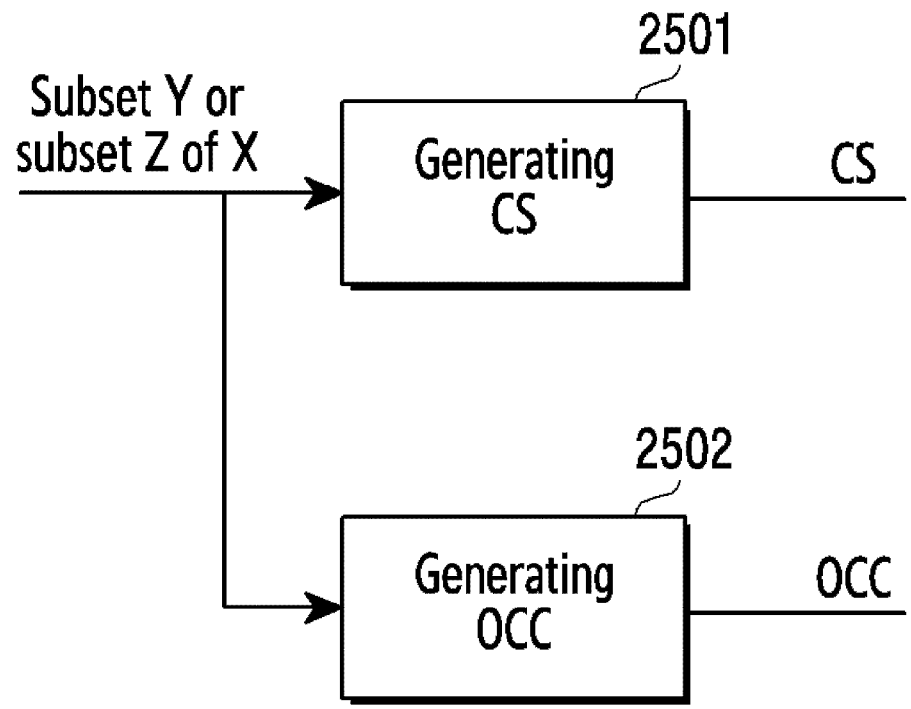

[Fig. 26]
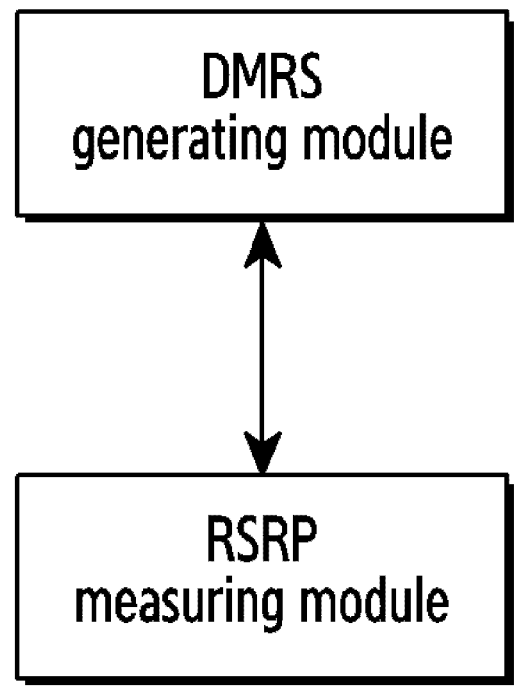

METHOD AND APPARATUS FOR PERFORMING DATA TRANSMISSION BASED ON MULTIPLE TRANSMISSION TIME INTERVALS, FOR TRANSMITTING CONTROL INFORMATION, AND FOR TRANSMITTING DATA BY EMPLOYING MULTIPLE PORTS

TECHNICAL FIELD

This disclosure generally relates to wireless communication system. More specifically, this disclosure relates to perform data transmission based on multiple transmission time intervals (TTIs) in a vehicle to vehicle/pedestrian/infrastructure/network (V2X) system, to transmit control information, and to transmit data on multiple antenna ports in a V2X system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE

Technical Problem

Embodiments of the disclosure provide a method and an apparatus for performing data transmission based on multiple transmission time intervals (TTIs) in a vehicle to vehicle/pedestrian/infrastructure/network (V2X) system, for transmitting control information, and for transmitting data on multiple antenna ports in a V2X system Embodiments of the disclosure provide a method and apparatus for performing data transmission based on multiple TTIs, which provides a mapping structure of a sTTI, a configuration policy of resource pool, a resource assignment mechanism and a resource selection process, so as to improve the transmission performance of UE.

Embodiments of the disclosure provides a method and an apparatus for allocating a physical uplink control channel (PUCCH) resource, which provides a mechanism for increasing the utilization rate of the upper limit resource and reducing the bit overhead of the downlink DCI.

Embodiments of the disclosure provides a method and apparatus for transmitting data, which provides a mechanism for further reducing the collision between UEs when the UE performs resource selection and data transmission, so as to improve the transmission performance of the UE.

Technical Solution

In one embodiment, a method for performing data transmission based on multiple TTIs is provided. The method includes: sensing, by a user equipment (UE), scheduling assignment (SA) of another UE in a sensing window based on TTIs with different lengths in a resource pool, measuring a receiving power of a scheduled data channel based on the SA, and sensing a receiving energy of each sub-channel of each subframe; selecting, by the UE, resources for data transmission according to the SA, the receiving power and the receiving energy; and transmitting, by the UE, the SA to indicate the selected resources, and performing data transmission on the resources.

The method further includes: dividing a long TTI (lTTI) into multiple short TTIs (sTTIs), setting an Automatic Gain Control (AGC) at the beginning of each sTTI, and setting a GAP at the end of each sTTI, wherein the length of the AGC of each sTTI is equal to the length of the AGC of the lTTI and the length of the GAP of each sTTI is equal to the length of the GAP of the lTTI; or, the length of the AGC of the first sTTI is equal to the length of the AGC of the lTTI, the length of the GAP of the last sTTI is equal to the length of the GAP of the lTTI, and the length of AGC or GAP of each of other sTTIs is shorter than the length of AGC or GAP of the lTTI, or the lengths of AGC and GAP of each of other sTTIs are shorter than the lengths of AGC and GAP of the lTTI respectively.

The method further includes: dividing a lTTI into multiple sTTIs, setting an AGC at the beginning of each sTTI, and setting a GAP at the end of the last sTTI, wherein the length of the GAP of the last sTTI is equal to the length of the GAP of the lTTI and the length of the AGC of each sTTI is equal to the length of the AGC of the lTTI, or the AGC of the first sTTI is equal to the length of the AGC of the lTTI, and the lengths of AGCs of other sTTIs are all shorter than the length of the AGC of the lTTI.

The method further includes: dividing a lTTI into multiple sTTIs, setting an AGC in the first sTTI, wherein the length of the AGC of the first sTTI is equal to the length of the AGC of the lTTI, setting a GAP in the last sTTI, wherein the length of the GAP of the last sTTI is equal to the length of the GAP of the lTTI, and inserting a shorter GAP and AGC between two adjacent sTTIs.

The method further includes: dividing a lTTI into multiple sTTIs, wherein the first and the last orthogonal frequency division multiplexing (OFDM) symbols of each sTTI transmit data on one subcarrier every N subcarriers, N is a constant.

The resource pool is configured according to a lTTI when the data transmission is performed based on the TTIs with different lengths; or the resource pool is configured according to each length of the TTIs respectively.

Suppose frequency resources occupied by the SA of a sTTI is m times frequency resources occupied by a lTTI, the SA resources q+[0,1, ... m−1] of the lTTI are occupied by the qth SA of the sTTI, q=0,1, ... M−1, M=N−m+1, and N is the number of data sub-channels of the lTTI.

Suppose frequency resources occupied by the SA of a sTTI is m times frequency resources occupied by a lTTI, the SA resources q·m+[0,1, ... m−1]+Δ1 of the lTTI are occupied by the qth SA of the sTTI, q=0,1, ... M−1, and M=⌊N/m⌋; and a data sub-channel q·m+[0,1, ... m−1]+Δ2 of the lTTI is occupied by the qth data sub-channel of the sTTI, Δ1 and Δ2 are parameters related to resource location, and N is the number of data subchannels of the lTTI.

When receiving SAs of TTIs with different lengths, for the TTIs with different lengths, thresholds of physical sidelink share channel-reference signal receiving powers (PSSCH-RSRPs) are different; or the threshold of a PSSCH-RSRP is recorded as Th, it is determined whether resources are available through comparing the PSSCH-RSRP with Th+Δ, and Δ is a power adjustment parameter; or it is determined whether resources are available through comparing PSSCH_RSRP+Δ with the threshold, the PSSCH_RSRP is the receiving power of data channel, and Δ is a power adjustment parameter.

When sensing the receiving energy sidelink-received signal strength indicator (S-RSSI) according to a lTTI, receiving energy of other symbols except AGC and GAP symbols of the lTTI is sensed; or the receiving energy of all symbols not used for GAPs is sensed, wherein symbols not used for GAPs does not include AGC and GAP symbols of the lTTI; or one lTTI resource is divided into multiple sTTI resources, and the S-RSSI of each sTTI resource are sensed firstly, and the S-RSSI of the lTTI resource is obtained according to the S-RSSI of each sTTI resource.

For a sTTI resource, if in a lTTI to which the sTTI resource belongs, other sTTI resources with the same or overlapped frequency location as the sTTI resource are unavailable, a probability that the UE selects the sTTI resource is increased.

When the number of SAs that can be sensed by the UE is smaller than the total number of SAs of multiple TTIs with different lengths in a lTTI, to-be-sensed SA resources are determined according to priorities of the TTIs with different lengths; or when the number of SAs that can be sensed by the UE is smaller than the total number of SAs of multiple TTIs with different lengths in a lTTI, the number of SA resources of lTTI to be sensed by the UE and the number of SA resources of sTTI to be sensed by the UE are determined respectively.

The number of to-be-sensed physical resource blocks (PRBs) of the TTIs with different lengths is determined according to priorities of the TTIs with different lengths; or the number of PRBs of lTTI to be sensed by the UE and the number of PRBs of sTTI to be sensed by the UE are determined respectively.

In another embodiment, an apparatus for performing data transmission based on multiple TTIs is provided. The apparatus includes: a sensing module, a resource selecting module and a receiving-transmitting module, wherein the sensing module is applied to a user equipment (UE) to sense scheduling assignment (SA) of another UE in a sensing window based on TTIs with different lengths in a resource pool, measure a receiving power of a scheduled data channel based on the SA, and sense a receiving energy of each sub-channel of each subframe; the resource selecting module is applied to the UE to select resources for data transmission according to the SA, the receiving power and the receiving energy; and the receiving-transmitting module is applied to the UE to transmit the SA to indicate the selected resources, and perform data transmission on the resources.

In yet another embodiment, a method for transmitting control information is provided, the method includes: detecting, by a user equipment (UE), a physical downlink control channel (PDCCH) on a configured control resource set (CORESET); parsing the detected PDCCH, correspondingly receiving a physical downlink shared channel (PDSCH), and determining physical uplink control channel (PUCCH) resources for feedback of uplink control information (UCI), by the UE; and transmitting a UCI on the determined the PUCCH resources, and a scheduled physical uplink shared channel (PUSCH), by the UE.

Preferably, the method further comprises at least one of the following steps: determining a starting point of a channel to which a second PUCCH format is mapped, according to an ending point of a channel to which a first PUCCH format is mapped; acquiring a parameter $N_{RB}^{(2,ref)}$ according to a higher-layer signaling, obtaining a parameter $N_{RB}^{(2)}$ according to the number of OFDM symbols (OSs) for PUCCH and the $N_{RB}^{(2,ref)}$, and determining a starting physical resource block (PRB) to which the second PUCCH format is mapped according to the parameter; and determining an offset $N_{PUCCH}^{offset}$ of the PUCCH resources, according to the number of OSs for bearing the PUCCH resources.

Preferably, the step of determining PUCCH resources for feedback of UCI, comprises one of the following: receiving configuration information of N PUCCH resources configured by a higher-layer signaling, and then adjusting the configured N PUCCH resources according to the number of OSs for PUCCH, and determining one of the N PUCCH resources as the PUCCH resource for feedback of UCI according to a hybrid automatic repeat request acknowledgement (HARQ-ACK) resource indication (ARI); for different number of OSs for bearing PUCCH resources, receiving respectively the N PUCCH resources configured by a higher-layer signaling, and, obtaining corresponding N PUCCH resources according to the number of OSs for bearing the PUCCH, and determining one of the N PUCCH resources as the PUCCH resource for feedback of UCI according to an ARI; receiving multiple sets of PUCCH resources configured by a higher-layer signaling, wherein each set of PUCCH resources includes N PUCCH resources, and determining one PUCCH resource of one set of N PUCCH resources as the PUCCH resource for feedback of UCI according to an ARI; and receiving multiple sets of PUCCH resources configured by a higher-layer signaling, wherein each set of PUCCH resources includes N PUCCH resources, and determining one PUCCH resource of one set of N PUCCH resources as the PUCCH resource for feedback of UCI by combining the number of OSs for bearing the PUCCH and an ARI.

Preferably, when a multiple of PUCCH formats exist, determining the PUCCH resources for each PUCCH format, respectively.

Preferably, when a multiple of PUCCH formats exist, determining the adopted PUCCH format according to the number of bits of UCI and the number of OSs for the PUCCH; or, determining the adopted PUCCH format according to the number of bits of UCI and the ARI; or, determining the adopted PUCCH format according to the number of bits of UCI, the number of OSs for bearing the PUCCH and the ARI.

Preferably, the step of determining the PUCCH resources for feedback of UCI, comprises one of the following: receiving configuration information of a set of PUCCH resources configured by a higher-layer signaling, adjusting the configured set of PUCCH resources according to the number of OSs for PUCCH, and determining the adjusted set of PUCCH resources as PUCCH resources for feedback of UCI; and for different number of OSs for bearing the PUCCH resources, receiving a set of PUCCH resources configured by a high-layer signaling, respectively, and determining a set of PUCCH resources as PUCCH resources for feedback of UCI according to the number of OSs for bearing the PUCCH.

Preferably, when a multiple of PUCCH formats exist, determining an adopted PUCCH resource according to the number of bits of UCI and the number of OSs for PUCCH, or determining an adopted PUCCH format and an adopted PUCCH resource according to the number of bits of UCI and the number of OSs for PUCCH.

Preferably, the number of PRBs unavailable for a frequency hopping operation of uplink data channel changes according to the number of OSs for bearing the PUCCH resources.

Preferably, the number of PRBs unavailable for a frequency hopping operation of uplink data channel is: a value configured by a higher-layer signaling; or, a value configured by a higher-layer signaling, and which is adjusted according to the number of OSs for bearing the PUCCH resources; or, a value configured by a higher-layer signaling according to different number of OSs for bearing the PUCCH resources, respectively.

Preferably, the configured CORESET comprising: configuring the CORESET(s) by distinguishing a downlink control information (DCI) format, respectively; or, for one configured CORESET, further configuring the borne DCI format(s).

Preferably, the CORESET bearing a fallback DCI format is sparser than the CORESET bearing a transmission mode-related DCI format.

Preferably, the step of detecting, by the UE, the PDCCH comprises: for a timing position, adjusting the number of PDCCH blind detections so that the total number of blind detections is equal to or close to the allowed maximum number of blind detections; or, adjusting the number of blind detections so that the total number of blind detections is equal to or close to the allowed maximum number of blind detections, only when the total number of PDCCH blind detections in one timing position exceeds the allowed maximum number of blind detections. or, adjusting the number of blind detections so that the total number of blind detections is equal to or close to the allowed maximum number of blind detections, only when the total number of blind detections in one timing position exceeds the allowed maximum number of blind detections.

Preferably, the step of adjusting the number of blind detections, comprises one of the following: jointly processing all configured CCs; respectively processing each CC; and jointly processing each set of CORESETs.

Preferably, in the PDCCH, a joint field is used to indicate a scheduled carrier and a bandwidth part (BWP); or, in the PDCCH, a joint field is used to indicate a scheduled carrier, a BWP and a time unit (TU).

Preferably, performing power control on the PUCCH and/or the PUSCH when transmitting the UCI on the determined PUCCH resources and the scheduled PUSCH, wherein, a parameter of power control is configured in one of the following ways: configuring the power control parameter for each BWP, respectively; configuring the power control parameter for each carrier, respectively, wherein each BWP on a carrier uses a same configured power control parameter; and configuring the power control parameter for each set of BWPs, respectively.

In yet another embodiment, an apparatus for transmitting control information is provided, the apparatus includes: a physical downlink control channel (PDCCH) detecting and parsing module, a physical downlink shared channel (PDSCH) receiving module, a physical uplink control channel (PUCCH) generating module and a transceiving module, wherein: the PDCCH detecting and parsing module, configured to detect, by the UE, a downlink control information (DCI) for scheduling the PDSCH on a configured control resource set (CORESET), and parse the detected DCI; the PDSCH receiving module, configured to receive the PDSCH according to the detected DCI; the PUCCH generating module, configured to generate a PUCCH signal to be fed back; and the transceiving module is configured to receive a downlink signal from a base station and transmit a PUCCH signal.

In yet another embodiment, a method for transmitting data with multiple ports is provided. The method includes detecting scheduling assignments (SAs) of other user equipment (UEs) by a UE in a time unit (TU), generating demodulation reference signal (DMRS) sequences of data channels, which are scheduled by the correctly decoded SAs; measuring reference signal received power (RSRP) of the data channels by the UE according to the DMRS sequences.

Preferably, the step of generating DMRS sequences of data channels comprises: generating two DMRS sequences, if one UE occupies two DMRS ports, wherein, root sequences and cyclic shifts (CSs) of the two DMRS sequences are the same, orthogonal cover codes (OCCs) of the two DMRS sequences are different.

Preferably, wherein, if the DMRS ports only occupy two OCCs, determining one OCC which is used for one DMRS port and the other OCC which is used for the other DMRS port, according to cyclic redundancy checks (CRCs) of the SAs; or, determining OCCs used for the two DMRS according to a mapping relation from the OCCs to the DMRS ports.

Preferably, if the DMRS ports use four OCCs, determining a first OCC and applies the first OCC to one DMRS port according to CRCs of SAs, and applies a second OCC to the other DMRS port, wherein, the second OCC is the OCC which is mapped to the first OCC.

Preferably, the step of measuring RSRP of data channels comprises: measuring RSRP in each DMRS symbol in one TU respectively, and obtaining RSRP of the whole TU according to the RSRP of each DMRS symbol.

Preferably, the step of generating DMRS sequences of data channels comprises one of the followings: if multiple DMRS ports occupied by one UE employ the same CS and different OCCs determining the OCCs according to bits in a subset Y of X, wherein, Y includes one or more bits, the bits in Y are also used for determining the CS simultaneously, and X is the information used for generating the DMRS sequence; if multiple DMRS ports occupied by one UE employ the same OCC and different CSs, determining the CSs according to bits in a subset Y of X, wherein, Y includes one or more bits, the bits of Y are used for determining the OCC simultaneously; or if multiple DMRS ports occupied by one UE employ different OCCs and different CSs, the bits in a subset Y of X being only used for determining the CS or only used for determining the OCC, wherein, Y includes one or more bits.

In yet another embodiment, an apparatus for transmitting data by employing multiple ports is provided. The apparatus includes: a demodulation reference signal (DMRS) generating module and a reference signal received power (RSRP) measuring module, wherein, the DMRS generating module is configured for detecting scheduling assignments (SAs) of other user equipment (UEs) by a UE in a time unit (TU), generating DMRS sequences of data channels, which are scheduled by the correctly decoded SAs; and the RSRP measuring module is configured for measuring RSRP of the data channels by the UE according to the DMRS sequences.

Preferably, wherein, if one UE occupies two DMRS ports, the DMRS generating module is configured for generating two DMRS sequences, wherein, root sequences and cyclic shifts (CSs) of the two DMRS sequences are the same, orthogonal cover codes (OCCs) of the two DMRS sequences are different.

Preferably, wherein, if the DMRS ports only use four OCCs, the DMRS generating module is configured for determining a first OCC and applying the first OCC to one DMRS port, and applying a second OCC to the other DMRS port according to cyclic redundancy checks (CRCs) of the SAs, wherein, the second OCC is the OCC which is mapped to the first OCC.

Preferably, wherein, if the DMRS ports use only two OCCs, the DMRS generating module is configured for determining one OCC which is used for one DMRS port and the other OCC which is used for the other DMRS port, according to cyclic redundancy checks (CRCs) of the SAs; or, determining OCCs used for the two DMRS, according to a mapping relation from the OCCs to the DMRS ports.

In yet another embodiment, a method for operating a terminal is provided. The method includes detecting, scheduling assignment (SA) of another terminal in a sensing window based on transmission time intervals (TTIs) with different lengths in a resource pool; detecting a receiving power of a scheduled data channel based on the SA and a receiving energy of each sub-channel of each subframe; determining resources for data transmission based on the SA, the receiving power and the receiving energy; and transmitting data on the resources.

In yet another embodiment, a method for operating a terminal is provided. The method includes detecting a physical downlink control channel (PDCCH) on a configured control resource set (CORESET); receiving a physical downlink shared channel (PDSCH) by parsing the detected PDCCH; determining physical uplink control channel (PUCCH) resources for feedback of uplink control information (UCI); and transmitting the UCI on the determined the PUCCH resources, and a scheduled physical uplink shared channel (PUSCH).

In yet another embodiment, a method for operating a terminal is provided. The method includes detecting scheduling assignments (SAs) of other terminals in a time unit (TU), generating demodulation reference signal (DMRS) sequences of data channels, which are scheduled by decoded SAs; and detecting reference signal received power (RSRP) of the data channels based on the DMRS sequences.

Advantageous Effects

A method and an apparatus according to various embodiments of the disclosure allows the conflict between UEs adopting TTIs with different lengths can be avoided as possible, the resource utilization can be improved, and transmission performance of TTIs with different lengths can be ensured.

With the method of the disclosure, a method for allocating PUCCH resources is provided to improve the utilization rate of upper limit resources. A method for indicating PUCCH resources in DCI is provided to reduce the bit overhead of DCI.

By employing the method of the disclosure, the interference caused by collision of UEs is avoided as much as possible, especially UE collision is avoided when the UE is not transmitting on one or more reserved resources, so as to improve the reliability of data transmission.

DESCRIPTION OF DRAWINGS

FIG. 1 illustrates a wireless communication system according to various embodiments of the disclosure.

FIG. 2 illustrates the BS in the wireless communication system according to various embodiments of the disclosure.

FIG. 3 illustrates the terminal in the wireless communication system according to various embodiments of the disclosure.

FIG. 4 illustrates the communication interface in the wireless communication system according to various embodiments of the disclosure.

FIG. 5 is a diagram illustrating resource selection based on sensing.

FIG. 6 is a flowchart illustrating resource selection based on sensing;

FIG. 7 is a flowchart of the disclosure.

FIG. 8 is a diagram illustrating the structure of a sTTI.

FIG. 9 is a diagram illustrating the SA resources and data channels of sTTI.

FIG. 10 is a diagram illustrating the SA resources and data channels of sTTI.

FIG. 11 is a diagram illustrating resource selection according to embodiments of the disclosure.

FIG. 12 is a diagram illustrating an apparatus according to embodiments of the disclosure.

FIG. 13 is a diagram illustrating a process of using half OFDM symbol as AGC.

FIG. 14 is a diagram illustrating a process of using half OFDM symbol as GAP.

FIG. 15 is a diagram illustrating a mapping process of using half OFDM symbol as data channels of AGC and GAP.

FIG. 16 shows a frame structure of the LTE system.

FIG. 17 is a flowchart according to the present invention.

FIG. 18 is a schematic diagram of resource allocations for two PUCCH formats.

FIG. 19 is a schematic diagram of a frequency hopping operation of an uplink data channel according to the present invention.

FIG. 20 is a schematic diagram of configuring DCI format and CORESET according to the present invention.

FIG. 21 is a block diagram of an apparatus according to the present invention.

FIG. 22 is a flowchart of the present invention.

FIG. 23 is a schematic diagram of distinguishing the DMRS ports based on OCC according to the present invention.

FIG. 24 is a first schematic diagram of generating the DMRS sequence according to the present invention.

FIG. 25 is a second schematic diagram of generating the DMRS sequence according to the present invention.

FIG. 26 is a schematic diagram of a device according to the present invention.

BEST MODE

Hereinafter, in various embodiments of the disclosure, hardware approaches will be described as an example. However, various embodiments of the disclosure include a technology that uses both hardware and software and thus, the various embodiments of the disclosure may not exclude the perspective of software.

In order to make the object, technical solution and merits of the disclosure clearer, the disclosure will be illustrated in detail hereinafter with reference to the accompanying drawings and specific embodiments.

Hereinafter, the disclosure describes technology for performing data transmission based on multiple transmission time intervals, for transmitting control information, and for transmitting data by employing multiple ports in a wireless communication system.

The terms referring to scheduling assignment (SA), the terms referring to a signal, the terms referring to a channel, the terms referring to control information, the terms referring to a network entity, and the terms referring to elements of a device used in the following description are used only for convenience of the description. Accordingly, the disclosure is not limited to the following terms, and other terms having the same technical meaning may be used.

Further, although the disclosure describes various embodiments based on the terms used in some communication standards (for example, 3rd Generation Partnership Project (3GPP)), they are only examples for the description. Various embodiments of the disclosure may be easily modified and applied to other communication systems.

FIG. 1 illustrates a wireless communication system according to various embodiments of the disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the disclosure, the controller 240 may control the base station to perform operations according to the exemplary embodiments of the disclosure.

FIG. 3 illustrates the terminal in the wireless communication system according to various embodiments of the disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the disclosure, the controller 330 may detect, scheduling assignment (SA) of another terminal in a sensing window based on transmission time intervals (TTIs) with different lengths in a resource pool; detect a receiving power of a scheduled data channel based on the SA and a receiving energy of each sub-channel of each subframe; determine resources for data transmission based on the SA, the receiving power and the receiving energy; and transmit data on the resources. Further, the controller 330 may detect a physical downlink control channel (PDCCH) on a configured control resource set (CORESET); receive a physical downlink shared channel (PDSCH) by parsing the detected PDCCH; determine physical uplink control channel (PUCCH) resources for feedback of uplink control information (UCI); and transmit the UCI on the determined the PUCCH resources, and a scheduled physical uplink shared channel (PUSCH). Further, the controller 330 may detect scheduling assignments (SAs) of other terminals in a time unit (TU), generate demodulation reference signal (DMRS) sequences of data channels based on the SAs; and detect reference signal received power (RSRP) of the data channels based on the DMRS sequences. For example, the controller 330 may control the terminal to perform operations according to the exemplary embodiments of the disclosure.

FIG. 4 illustrates the communication interface in the wireless communication system according to various embodiments of the disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In a V2X system based on long term evolution (LTE) of 3GPP, there are two structures for configuring a physical sidelink control channel (PSCCH) resource pool and a physical sidelink share channel (PSSCH) resource pool. The PSCCH and a PSSCH scheduled by it may belong to the same subframe, or the PSCCH and any PSSCH scheduled by it do not belong to the same subframe. The PSCCH resource pool and the PSSCH resource pool occupy the same subframe set. One PSCCH is mapped to two physical resource blocks (PRBs) changelessly. The assignment granularity of frequency resources is sub-channel. One sub-channel includes continuous PRBs, and the number of the PRBs is configured by high layer signalings. Resources needed by one user equipment (UE) may occupy one or more continuous sub-channels. When the PSCCH and the PSSCH belong to the same subframe, the PSCCH and the PSSCH may occupy continuous PRBs. In the one or more sub-channels occupied by the resources needed by one UE, two PRBs, for example, two PRBs with the lowest frequencies, are used to bear the PSCCH, and other PRBs are used to bear the PSSCH. The number of PRBs actually occupied by the PSSCH needs to meet must be the power of 2, 3 and 5. When the PSCCH and the PSSCH belong to the same subframe, the PRBs occupied by the PSCCH and the PRBs occupied by the PSSCH may be uncontinuous. In this case, the starting position of the PRBs of the PSCCH resource pool and the starting position of the PRBs of the PSSCH resource pool may be configured respectively. In the PSSCH resource pool, resources may be assigned with the granularity of sub-channel. For a UE, the index of the PSCCH occupied by it is the same as the index of the smallest sub-channel of the PSSCH occupied by it.

In the V2X system, a collision problem and an intra-band leakage problem may be solved based on sensing. Here, suppose a UE occupies resources based on semi-persistent scheduling (SPS), that is, the UE occupies the resources periodically during a period of time. As shown in FIG. 5, suppose the time of selecting PSCCH/PSSCH resources by the UE is subframe n, the UE first senses resources in a resource pool during a period of time from subframe n-a to subframe n-b, determines which time-frequency resources are occupied and which time-frequency resources are idle, and then selects the PSCCH/PSSCH resources in subframe n. Suppose the PSCCH is transmitted in subframe n+c, the PSSCH is transmitted in subframe n+d, and reserved resources are in subframe n+e. Afterwards, the PSCCH is transmitted in subframe n+c, the PSSCH is transmitted in subframe n+d, and the reserved resources is used to transmit the next PSSCH in subframe n+e. When c is equal to d, the PSCCH and the PSSCH belong to the same subframe. An interval between subframe n+e and subframe n+d is equal to a reservation interval P. The reservation interval P is equal to Pstep·k, for example, Pstep=100, i.e., supports a delay not larger than about 100 ms. The range of k may be a set including all integers from 1 to 10 or a subset of the set. The range of k may be configured by a higher layer. When performing resource selection, the UE may select K resources belonging to different subframes, i.e., each piece of data may be transmitted repeatedly for K times, wherein K is larger than or equal to 1, for example, K=2, so as to avoid that some UEs are unable to receive the data because of the limitation of half duplex operations. When K is larger than 1, each PSSCH may indicate all the K resources.

FIG. 6 is a flowchart illustrating resource selection based on sensing. Suppose resource selection is performed in subframe n, a reservation interval of currently reserved resources of user equipment (UE) is PA, and the number of cycles during which resources need to be reserved is C. The UE may select resources within a selection window [n+T1, n+T2] and continuously reserve the resources for C cycles with the reservation interval PA. T1 and T2 depend on the implementation of the UE, for example, T1≤4 and 20≤T2≤100. T1 depends on the influence of a delay from selecting resources by the UE to transmitting scheduling assignment (SA) signalings and data, and T2 depends on a delay that a current service can tolerate. First, it may be set that all resources within the selection window are in a set SA (601). Afterwards, according to an accurately received SA, suppose the SA indicates that the resources continue to be reserved after a subframe n, the receiving power of a data channel scheduled by the SA is measured, and when the receiving power exceeds a threshold, part of candidate resources of SA are excluded (602). Specifically, when the receiving power exceeds the threshold, resource Y reserved after the subframe n according to the SA is unavailable. The threshold is determined according to the priority of the UE performing resource selection and the priority indicated by the accurately received SA. Suppose Rx,y represents a single-subframe resource within the selection window [n+T1, n+T2] and Rx,y belongs to a subframe y and contains one or more continuous sub-channels beginning from a sub-channel x. When the PRB of $R_{x,y+jP_A}$ overlaps with the PRB of the subframe Y, Rx,y is unavailable for UE A, i.e., Rx,y is excluded from the set SA, wherein j=0,1, . . . C−1, and C is the number of cycles during which the UE A needs to reserve resources according to the reservation interval PA. Afterwards, it is determined whether the remained resources of SA reach a ratio R of total resources, for example, 20% (603). If the ratio of the remained resources is smaller than R, the threshold is increased by 3 dB (204) and block 601 is performed again; otherwise, block 605 is performed. At block 605, the receiving energy of the remained resources of the SA is estimated, and the resources with minimum receiving energy is moved to a set SB until the ratio of resources of SB reaches R. For a resource containing multiple sub-channels, the receiving energy of the resource is an average of receiving energies of all sub-channels contained in the resource. Afterwards, resources for data transmission are selected from the resources of SB (606) and data transmission is performed on the selected resources (607). When a piece of data is transmitted for two times, the UE first selects a resource for data transmission from SB, and then selects another resource for data transmission within a range indicated by the SA when delay requirements are met and available resources exist.

In order to improve the performance of the V2X system, one solution is to adopt a shorter TTI. A short TTI (sTTI) helps to decrease the transmission delay, and helps to avoid a problem that data of other UE cannot be received because of half duplex operations. A to-be-solved problem is how to effectively support data transmission of a UE on multiple carriers.

In a wireless communication system, a downlink transmission refers to a signal transmission from a base station to a user equipment (UE). Downlink signals comprise data signals, control signals and reference signals (pilot frequency). Here, the base station transmits downlink data in a physical downlink shared channel (PDSCH), or transmits downlink control information in a downlink control channel. An uplink transmission refers to a signal transmission from a UE to a base station. Uplink signals also comprise data signals, control signals and reference signals. Here, the UE transmits uplink data in a physical uplink shared channel (PUSCH), or transmits uplink control information in a physical uplink control channel (PUCCH). The base station can dynamically schedule PDSCH transmission and PUSCH transmission of the UE through a physical downlink control channel (PDCCH).

In the 3GPP LTE system, as shown in FIG. 16, each radio frame has a length of 10 ms and is equally divided into 10 sub-frames. Each downlink subframe comprises two slots; each slot includes 7 OFDM symbols for a common cyclic prefix (CP) length. A granularity for resources allocation is a physical resource block (PRB). One PRB includes 12 contiguous subcarriers in frequency and corresponds to one slot in time. A resource element (RE) is the smallest unit of time-frequency resources, that is, the RE is one subcarrier in frequency and one OFDM symbol in time.

In the LTE system, the DCIs transmitted to different UEs or DCIs for different functions are independently encoded and transmitted. When physical resource mapping is performed on the PDCCH, a control channel element (CCE) is used as a unit, that is, a modulation symbol of one PDCCH can be mapped to L CCEs, wherein L is equal to 1, 2, 4 or 8, and L is also called as an aggregation level of PDCCH. In the LTE system, the UE is configured to detect PDCCHs on a multiple of possible positions, which is called search space of the UE. The base station transmits a PDCCH to this UE on a position in the search space which the UE is configured to detect, and the UE obtains the control information transmitted by the base station through a blind detection in the search space configured by the base station. For HARQ-based downlink data transmission, after the UE detects the PDCCH and receives the PDSCH correspondingly, corresponding HARQ-ACK information can be fed back on the PUCCH.

The 3GPP standards organization is standardizing the new radio access network technology (NR), which is still an OFDM-based system. Therefore, how to effectively support the uplink and downlink control channel transmission is a problem to be solved.

In a V2X (vehicle to vehicle/pedestrian/infrastructure/network) system based on a long term evolution (LTE) of standardization organizations of 3GPP, a UE firstly transmits a physical sidelink control channel (PSCCH) to indicate information, such as a time-frequency resource occupied by a data channel, a modulation and coding scheme (MCS); next, the UE transmits data on a physical sidelink shared channel (PSSCH) scheduled by the PSCCH. For a LTE D2D/V2X system, a channel for transmitting a Scheduling Assignment (SA) is also called PSCCH, and the data channel is also called PSSCH. The assignment granularity of frequency resources is a sub-channel, wherein a sub-channel includes continuous physical resource blocks (PRBs), and the number of PRBs is configured by higher-layer signaling. One or more continuous sub-channels can be occupied by resources of a device.

For a UE, the device can reserve resources periodically according to a certain reserved interval since its data is basically periodically generated for a period of time; and each data can be transmitted repeatedly for K times, and correspondingly K resources need to be reserved, wherein K is greater than or equal to 1, so as to avoid that part of the devices cannot receive this data due to the restriction of half-duplex operation. The UE can select K resources which can be occupied by the UE and reserve C continuous cycles according to the detection information within a detection window. A method for detecting resources is to obtain the PSSCH scheduled by the above PSCCH based on the decoding on the PSCCHs of other UEs, so that the received power, i.e., PSSCH-reference signal received power (PSSCH-RSRP) corresponding to the UE can be measured, so as to decide the resource occupation and/or the resource reservation based on the received power and the reserved interval in PSCCH. Another method for detecting resource is to deciding resource occupation and/or resource reservation based on a received energy, i.e., sidelink received signal strength indication (S-RSSI). For a resource on subframe x within a selection window, the above received energy refers to the average value of the received energy of the same sub-channel resources on the subframe x-Prsvp·j within the detection window, wherein, Prsvp in the reservation interval, for example, j is an arbitrary integer. By combining the above two methods, it can be avoided that the transmission of the device occupies the same resources as that of other devices as much as possible.

In the V2X system in the version 14 of the LTE, the UE (hereafter referred to as an R14 UE) transmits the PSCCH and PSSCH through a single antenna port. For the UE configured with multiple antennas, the performance of the V2X system can be furtherly enhanced based on a transmit diversity technology. However, for the UE employing the transmit diversity technology employing the two ports, the R14 UE can only measure the PSSCH-RSRP according to one antenna port, resulting in that the measured PSSCH-RSRP can be smaller than the actual PSSCH-RSRP by 3 dB. The deviation of the value of the measurements of the PSSCH-RSRP can affect the performance of a resource selection algorithm based on the PSSCH-RSRP. How to further enhance the V2X technology is an urgent problem to be solved if the transmit diversity technology is effectively supported.

In V2X communication, there are a plurality of types of UEs, for example, a vehicle UE (VUE), a pedestrian UE (PUE) and a road-side UE (RSU). The data transmission mechanism of a UE is described as follows. The UE transmits a control channel to indicate such information as time-frequency resources occupied by a data channel and a modulation and coding scheme (MCS), which is called a SA signaling hereinafter. Afterwards, the UE transmits data on the scheduled data channel. For a LTE D2D/V2X system, the SA is also called a PSCCH, and the data channel is also called a PSSCH. For a UE, since its data is generated periodically during a period of time, the UE may reserve resources periodically according to a reservation interval. Each piece of data may be transmitted repeatedly for K times, and correspondingly, K resources need to be reserved, wherein K is larger than or equal to 1, so as to avoid that some UEs are unable to receive the data because of the limitation of half duplex operations.

Suppose multiple TTIs with different lengths are adopted, the longest TTI is called lTTI, other TTIs are called sTTIs, and the sTTIs may have one or more lengths. One lTTI may be divided into multiple sTTIs. The sTTI helps to decrease a data transmission delay, especially is applicable to some services requiring a stricter delay. In a resource pool, a TTI of one length may be used, for example, a lTTI or a sTTI. Or, data transmission based on the lTTI and the sTTI may exist at the same time. Preferably, the SA and the data channel of a UE use a TTI with the same length.

FIG. 7 is a flowchart illustrating a method supporting multiple TTIs with different lengths according to the embodiments of the disclosure. The method includes following blocks.

At block 701, a UE senses SA of another UE in a sensing window based on TTIs with different lengths in a resource pool, and measures a receiving power of a scheduled data channel based on the SA, and senses a receiving energy of each sub-channel of each subframe.

When sensing the receiving power and the receiving energy, the influence of coexistence of multiple TTIs with different lengths should be considered.

At block 702, the UE selects resources for data transmission based on the SA, the receiving power and the receiving energy.

During the resource selection, the influence between UEs adopting TTIs with different lengths should be avoided as possible, so as to improve the coexistence performance.

At block 703, the UE transmits the SA to indicate the selected resources, and performs data transmission on the resources.

For multiple sTTI obtained through dividing a lTTI, each sTTI contains AGC symbol(s), demodulation reference signals (DMRSs) and data symbols, and GAP symbol(s). The AGC symbol is used to adjust an operating point by a receiving end, and may transmit data or may not transmit data. The GAP symbol is a time interval used for receiving-transmitting switching time of the UE, so as to avoid the overlap of V2X signals and cellular network signals and the overlap of V2X signals.

Further, the disclosure provides various embodiments to illustrate the method supporting multiple TTIs with different lengths.

A first embodiment is described as follows.

In an actual communication application, it is difficult to learn the type of UE and the distribution of services in advance. For example, it is difficult to learn the type of UE and the distribution of services according to the service amount in a lTTI and the service amount in a sTTI. Accordingly, data transmission supporting both the lTTI and the sTTI in the same resource pool needs to be considered.

FIG. 8(a) shows the structure of a lTTI. The first OFDM symbol of the lTTI is used for AGC, so data on the first OFDM symbol may not be used for decoding. The last OFDM symbol of the lTTI is punctured, and can be used to generate the receiving-transmitting switching time of the UE as a GAP. When multiplexing V2X and cellular network communication on one carrier, the last OFDM symbol may avoid the overlap of V2X signals and cellular network signals, and avoid the overlap of V2X signals of different UEs. For example, the structure of V2X subframe in LTE version 14 adopts the structure of the lTTI shown in FIG. 8(a).

One lTTI may be further divided into two or more sTTIs. The length of AGC and GAP needed by the UE supporting the sTTI may be the same as the length of AGC and GAP needed by the UE only supporting the lTTI. Or, since the delay is more stricted for the UE supporting the sTTI, the processing capability of the UE for the AGC and the GAP may be improved correspondingly. Accordingly, the length of AGC and GAP may be shortened. In addition, suppose the transmission of the cellular network adopts the lTTI, the transmission overlap with the cellular network does not exist except the last sTTI.

As shown in FIG. 8(b), an AGC may be set at the beginning of each sTTI, and a GAP is set at the end of each the sTTI. The length of the AGC of each sTTI is equal to that of the lTTI and the length of the GAP of each sTTI is equal to that of the lTTI. Or, the length of the AGC of the first sTTI is equal to that of the lTTI, the length of the GAP of the last sTTI is equal to that of the lTTI, and the length of AGC or GAP of each of other sTTIs is shorter than the length of AGC or GAP of the lTTI, or the lengths of AGC and GAP of each of other sTTIs are shorter than that of the lTTI respectively. For example, the AGC of the first sTTI and the GAP of the last sTTI may include multiple OFDM symbols, and the AGC or the GAP of each of other sTTIs only include one OFDM symbol or both AGC and GAP of each of other sTTIs include one OFDM symbol respectively. The GAP may be used as the receiving-transmitting switching time of the UE, and may avoid the overlap of V2X signals of different UEs. Since the GAP is introduced, the receiving-transmitting operations of the UE in one sTTI do not influence the receiving-transmitting operations of the UE in the next sTTI. However, this method will cause larger overhead of the AGC and the GAP.

As shown in FIG. 8(c), an AGC may be set at the beginning of each sTTI, and a GAP is set at the end of the last sTTI. The length of the GAP of the last sTTI is the same as the length of the GAP of the lTTI. The length of the AGC of each sTTI is the same as that of the lTTI. Or, the length of the AGC of the first sTTI is the same as that of the lTTI, the lengths of AGCs of other sTTIs are all shorter than that of the lTTI. For example, the AGC of the first sTTI may include multiple OFDM symbols, and AGCs of other sTTIs only include one OFDM symbol respectively. Since the GAP is not set at the ends of other sTTIs, the receiving-transmitting operations on the next sTTI will be influenced. Suppose the UE transmits signals in one sTTI, the UE may implement the transmitting-to-receiving switching by using the former part of the AGC symbol of the next sTTI, which means that the UE implements AGC operations only by using the remaining part of the AGC symbol. Or, the UE may not perform the receiving operation in the next sTTI. Suppose the UE receives signals in one sTTI, the UE may implement the receiving-to-transmitting switching by using the former part of the AGC symbol of the next sTTI, which means that the UE can transmit effective signals or data for AGC only by using the remaining part of the AGC symbol. Or, the UE may not perform the transmitting operation in the next sTTI.

As shown in FIG. 8(d), an AGC may be set at the beginning of the first sTTI, and the length of the AGC of the first sTTI is the same as that of the lTTI. A GAP is set at the end of the last sTTI, and the length of the GAP of the last sTTI is the same as that of the lTTI. A shorter GAP and a shorter AGC are inserted between adjacent two sTTIs, that is, the length of the inserted GAP and AGC is shorter than the length of the GAP and AGC of the lTTI respectively. For example, one OFDM symbol is used to generate the GAP and the AGC. Since the GAP and the AGC are introduced, the receiving-transmitting operations of the UE in one sTTI do not influence the receiving-transmitting operations of the UE in the next sTTI. Since the AGC and the GAP are shorter, the overhead of the AGC and the GAP may be decreased.

As shown in FIG. 8(e), suppose a subcarrier spacing (SCS) adopted by the sTTI is larger than that of the lTTI, the length of OFDM symbols of the sTTI is shorter than that of the lTTI. An AGC may be set at the beginning of the first sTTI, and the length of the AGC is the same as that of lTTI, for example, the AGC occupies OFDM symbols of multiple sTTIs. A GAP is set at the end of the last sTTI, and the length of the GAP is the same as that of lTTI, for example, the GAP occupies OFDM symbols of multiple sTTIs. A shorter GAP and a shorter AGC are inserted between adjacent two sTTIs, that is, the length of the inserted GAP and AGC is shorter than the length of the GAP and AGC of the lTTI, for example, the inserted GAP and AGC occupy one OFDM symbol of one sTTI respectively. Since the GAP and the AGC are introduced, the receiving-transmitting operations of the UE in one sTTI do not influence the receiving-transmitting operations of the UE in the next sTTI. Since the AGC and the GAP are shorter, the overhead of the AGC and the GAP may be decreased.

In the methods shown in FIGS. 4(b)~4(e), in the OFDM symbols for AGC, all subcarriers may be occupied to transmit data, for example, transmit data in the AGC with the SCS of 15 kHz, or transmit data in one subcarrier every N subcarriers, for example, N is equal to 2. If the latter method is adopted, signals on the OFDM symbols for AGC have a repeated structure in time. As shown in FIG. 13, suppose N is equal to 2, the AGC symbol may be divided equally into two parts, and based on the latter part of the AGC symbol, all data may be received. The receiving end may perform AGC operations by using the former part of the AGC symbol, and receive data on the latter part of the AGC symbol, thereby decreasing the overhead of the AGC. Depending on the implementation of the receiving end, the latter part of the AGC symbol may be used to receive data, or the AGC symbol may not be used to receive data.

As shown in FIG. 8(f), suppose on the AGC symbol, data is transmitted on one subcarrier every N subcarriers, so as to have the repeated structure shown in FIG. 13, and suppose the OFDM symbol containing the GAP also transmits data on one subcarrier every N subcarriers, for example, N is equal to 2. As shown in FIG. 14, suppose N is equal to 2, the OFDM symbol may be divided equally into two parts, and all data can be received based on the former part of the OFDM symbol. The former part of the OFDM symbol may still transmit data, but stop transmitting data on the latter part of the OFDM symbol to generate the GAP, thereby decreasing the overhead of the GAP. The last symbol of the lTTI may generate the GAP according to the method shown in FIG. 14, or does not transmit any signal, so that the whole symbol may be used for the GAP. Depending on the implementation of the receiving end, the latter part of the AGC symbol may be used to receive data, or the AGC symbol may not be used to receive data. Depending on the implementation of the receiving end, the former part of the OFDM symbol containing the GAP may be used to receive data, or the OFDM symbol containing the GAP may not be used to receive data.

For the structure of a sTTI shown in FIG. 8(f), suppose the first and the last OFDM symbols of the sTTI both transmit data on one subcarrier every N subcarriers. As shown in FIG. 15, suppose N is equal to 2, the total amount of data transmitted on the first OFDM symbol and the last OFDM symbol is equivalent to the total amount of data transmitted on OFDM symbols with the SCS of 15 kHz. In FIG. 15(a), suppose a subcarrier for data transmission on the first OFDM symbol of the sTTI is the same as a subcarrier for data transmission on the last OFDM symbol of the sTTI. In FIG. 15(b), suppose the subcarrier for data transmission on the first OFDM symbol of the sTTI is different from the subcarrier for data transmission on the last OFDM symbol of the sTTI. For a mapping structure shown in FIG. 15, rate matching may be processed according to a case that a data channel includes time-frequency resources of integral OFDM symbols. For example, in FIG. 15, suppose two OFDM symbols are used to bear DMRSes, the number of OFDM symbols for actual data transmission is 4. That is, the rate matching may be processed according to 4 OFDM symbols, but actually the modulation symbols of data are mapped to 5 OFDM symbols for data transmission.

A second embodiment is described as follows.

When data transmission based on both lTTI and sTTI is supported in one resource pool, the resource pool may be configured or pre-configured according to the lTTI. In the LTE version 14, after excluding some subframes unavailable for V2X, for example, subframes of sidelink synchronization channel (SLSS), time division duplexing (TDD) downlink subframes and reserved resources. All remained subframes are logically ordered, and then the resource pool is defined through periodically applying bitmap based on the indexes of the ordered logic subframes. The '1' in the bitmap represents that the subframe belongs to the resource pool, and the '0' represents that the subframe does not belong to the resource pool.

For the data transmission based on the lTTI, the resource pool may be configured based on the indexes of physical subframes, or may be defined based on the indexes of logic subframes according to the method described in the LTE version 14. For the data transmission based on the sTTI, the resource pool is still defined according to the lTTI, so that additional signaling or configuration information is not needed. Suppose one lTTI is divided into M sTTIs, the index of the mth sTTI in the lTTI with the index k is k·M+m, wherein k=0,1, . . . , K−1, m=0,1, . . . , M−1 and K is a maximum value among the indexes of the lTTI. According to this method, for a service, suppose the reservation interval is Prsvp=k·Pstep when adopting the data transmission based on the lTTI, wherein Pstep is a basic reservation interval, for example, 100, k is a coefficient, and the range of k may be configured by a higher layer. In the LTE version 14, a maximum set of the range of k is [⅕,½,1,2,3,4,5,6,7,8,9,10], and the reservation interval is $P_{rsvp}^{(s)}=k \cdot M \cdot P_{step}$ when adopting the data transmission based on the sTTI. Or, the sTTI is represented with a two-dimensional index (k, m), wherein k is the index of the lTTI to which the sTTI belongs, and m is the index of the sTTI in the lTTI. According to the method, the reservation interval of the sTTI is equal to the reservation interval of the lTTI, that is, Prsvp=k·Pstep, but the influence of the two-dimensional index (k, m) needs to be considered when performing resource selection and indicating resources in the SA.

Or, for a resource pool, some time units (TUs) unavailable for V2X may be excluded. The TUs may be subframes, time slots or mini-slots, and one time slot may be divided into multiple mini-slots. The lTTIs of all remained TUs are ordered by the UE adopting the lTTI, and then a first resource pool is defined based on the indexes of the ordered logic subframes. The sTTIs of all remained TUs are ordered by the UE adopting the sTTI, and then a second resource pool is defined based on the indexes of the ordered logic subframes. In view of the time resource, the first resource pool and the second resource pool may overlap entirely, or overlap partially.

A third embodiment is described as follows.

In the case that the data transmission amount is unchanged, if the TTI is shortened, frequency resources needed by the UE are increased, so as to ensure the transmission performance. For example, suppose 2 PRBs are occupied when the SA is transmitted in the lTTI and one lTTI is divided into 2 sTTIs, about 4 PRBs needs to be occupied when the SA is transmitted in one sTTI. As shown in FIG. 8(b), 8 OFDM symbols in the lTTI are used to bear data. Because of the overhead of additional AGC and GAP, the number of OFDM symbols for bearing DMRSes and data in the sTTI is 5. Suppose two OFDM symbols are used to bear the DMRSes, only 3 OFDM symbols are used to bear data. In this case, when ensuring the coding rate of the SA is unchanged, the number of needed PRBs is 16/3. Through decreasing the number of bits of the SA of the sTTI, the number of needed PRBs may be decreased.

For a resource pool, according to the lTTI, a data channel is divided into N sub-channels, and resources are assigned based on the sub-channels. Correspondingly, a SA resource pool is also divided into N SA resources, so as to correspond to N sub-channels. Because the length of the TTI changes, the number of data sub-channels of sTTI may be the same as or larger than the number of data sub-channels of lTTI.

Suppose the number of PRBs of data sub-channels of the sTTI is the same as that of the lTTI, and suppose frequency resources occupied by the SA of one sTTI is m times frequency resources occupied by the lTTI. As shown in FIG. 9, the SA resources q+[0,1, . . . m−1] of the lTTI are occupied by the qth SA of the sTTI, wherein q=0,1, . . . M−1, M=N−m+1. The data sub-channels linked to the qth SA of the sTTI may begin from a data sub-channel q and be assigned with the granularity of n continuous sub-channels. For example, n may be equal to 1 or m, and may be configured by a higher layer signaling or pre-configured. If n is larger than 1, it is advantageous to decrease the overhead of indicating sub-channel resources in the SA.

Or, suppose frequency resources occupied by the SA of one sTTI is m times frequency resources occupied by the lTTI, and the number of PRBs of data sub-channels of one sTTI is also m times that of the lTTI. As shown in FIG. 10, the SA resources q·m+[0,1, . . . m−1]+Δ1 of the lTTI are occupied by the qth SA of the sTTI, wherein q=0,1, . . . , M−1 and M=⌊N/m⌋, and the data sub-channel q·m+[0,1, . . . m−1]+Δ2 of the lTTI is occupied by the qth data sub-channel of the sTTI. When m is not divisible by N, the Δ1 and the Δ2 may adjust the location of SA resources occupied by the SA of the sTTI in the SA resource pool and the location of sub-channels occupied by the data sub-channels of the sTTI in the data resource pool. The Δ1 may be equal to or unequal to the Δ2. For example, the Δ1 and the Δ2 are both equal to 0. For the sTTI, the SA resources correspond to the data sub-channels one by one. The qth SA of the sTTI may schedule one or more continuous data sub-channels of the sTTI beginning from the data sub-channel q of the sTTI. This method may decrease the overhead of indicating sub-channel resources in the SA.

A fourth embodiment is described as follows.

When data transmission based on both lTTI and sTTI is supported in one resource pool, the influence of the data transmission based on both lTTI and sTTI should be considered during the resource selection of UE.

The UE senses the SA of another UE, and measures the PSSCH-RSRP of data channel scheduled by the received SA, so as to perform resource selection according to the above PSSCH-RSRP. The UE needs to sense the SA of the lTTI and the SA of the sTTI. When the measured PSSCH-RSRP exceeds a threshold, the corresponding data channel is unavailable. For TTIs with different lengths, the thresholds of PSSCH-RSRPs may be different. For TTIs with different lengths, the thresholds of PSSCH-RSRPs may be configured or pre-configured respectively. Or, when the length of the TTI adopted by the sensed UE is the same as or different from the length of the TTI adopted by the UE performing sensing, the thresholds of PSSCH-RSRPs may be configured or pre-configured respectively. Or, the threshold of PSSCH-RSRP is recorded as Th, and when a UE senses the SA scheduling a TTI with the same length, the PSSCH-RSRP is compared with Th to determine whether resources are available. When a UE senses the SA scheduling TTIs with different lengths, the PSSCH-RSRP is compared with Th+Δ to determine whether resources are available, wherein Δ is a power adjustment parameter, which is a constant or is related to the priorities of the sensed UE and/or the UE performing sensing. For example, the threshold of the PSSCH-RSRP corresponding to the SA scheduling TTIs with different lengths may be smaller than the threshold of the PSSCH-RSRP corresponding to the SA scheduling TTI with the same length, so as to first exclude the resources occupied by other UEs adopting TTIs with different lengths, and avoid the conflict between UEs adopting TTIs with different lengths. Or, the threshold of the PSSCH-RSRP is recorded as Th, and when a UE senses the SA scheduling a TTI with the same length, it is determined whether resources are available through comparing the PSSCH-RSRP with the threshold Th. When a UE senses the SA scheduling TTIs with different lengths, the PSSCH-RSRP measured according to the SA may be modified, that is, it is determined whether the resources are available through comparing the PSSCH_RSRP+Δ with the threshold Th, wherein Δ is a power adjust parameter, which is a constant or is related to the priorities of the sensed UE and/or the UE performing sensing. For example, Δ may be a negative value, so as to first exclude the resources occupied by other UEs adopting the TTI with the same length, and allow the conflict between UEs adopting TTIs with different lengths. In a case that equal amounts of data are transmitted, if the sTTI is adopted, more frequency resources will be occupied, and if the lTTI is adopted, more time resources will be occupied. UEs adopting two transmission methods will not conflict absolutely, so the partial overlap of resources occupied by UEs adopting TTIs with different lengths influences the data reception to a lesser degree. The method for excluding resources according to the PSSCH-RSRP may be only used when the UE performing sensing adopts the lTTI, or may be only used when the UE performing sensing adopts the sTTI, or may be used by the UE performing sensing without differentiate the length of the TTI adopted by the UE performing sensing.

The UE may also measure S-RSSI of resources, and select several resources with minimum S-RSSIs to obtain a set SB. The length of the TTI of the above resources is the same as the length of the TTI adopted by the UE. In order to obtain the S-RSSI of one lTTI resource, suppose the S-RSSI is measured according to the lTTI. For a lTTI, the UE may obtain the S-RSSI through measuring other symbols except the AGC and GAP symbols of the lTTI. Or, for a lTTI, because the lTTI is divided into multiple sTTIs and each sTTI may have its own GAP symbol, the UE may measure the S-RSSI on all symbols not used for GAP, wherein symbols not used for GAPs does not include the AGC and GAP symbols of the lTTI. For example, except the AGC and GAP symbols of the lTTI, in the method shown in FIG. 8(b), the GAP symbol of the first sTTI is not used to measure the S-RSSI; in the method shown in FIG. 8(d), the GAP in the former part of the second sTTI is not used to measure the S-RSSI; in the method shown in FIG. 8(e), the GAP symbol of the first sTTI is not used to measure the S-RSSI. The UE may also measure the S-RSSI only on a subset of time resources determined according to the above rule. In this method, since the GAP symbol of the sTTI is not used to measure the S-RSSI, the strength of interference signals can be estimated accurately, so as to decrease conflict. In order to obtain the S-RSSI of one sTTI resource, suppose the S-RSSI is measured according to the sTTI. For a sTTI, the UE may obtain the S-RSSI through measuring other symbols except the AGC and GAP symbols of the sTTI. For a lTTI resource, suppose the lTTI resource is divided into N sTTI resources sn in time, n=0,1 ... N−1, and the frequency resources of sn are the same as the lTTI resource. In order to obtain the S-RSSI of the lTTI resource, the UE may first measure the S-RSSI of each sTTI resource sn, and then obtain the S-RSSI of the lTTI resource according to the S-RSSI of each sTTI resource sn. For example, the S-RSSI of the lTTI resource may be a maximum value, an average value or a weight average value of the S-RSSIs of sTTI resources sn. The above method for measuring the S-RSSI may be only used when the UE performing sensing adopts the lTTI, or may be only used when the UE performing sensing adopts the sTTI, or may be used by the UE performing sensing without differentiate the length of the TTI adopted by the UE performing sensing.

Afterwards, the UE selects resources in the set SB. The UE may randomly select resources in the set SB. Or, suppose the UE adopts the sTTI, for a sTTI resource in the SB, if other sTTI resources with the same frequency location or overlapping with the sTTI resource are unavailable in the lTTI to which the sTTI resource belongs, the UE selects the sTTI resource with a large probability. By using the method, the UE adopting the sTTI can use the same or adjacent PRBs in one lTTI as possible, so as to reserve more lTTI resources for the UE adopting the lTTI, and further avoid the conflict between UEs adopting TTIs with different lengths. As shown in FIG. 11, suppose resources 1102 and 1111 are unavailable, and other four resources 1101, 1112, 1103 and 1113 are all available. Because the resources 1103 and 1113 belong to the same PRB, the probability that the resources 1103 and 1113 are selected by the UE adopting the sTTI is smaller than the probability that the resources 1101 and 1112 are selected by the UE adopting the sTTI, so as to facilitate the lTTI resource composed by the resources 1103 and 1113 to be selected by other UEs adopting lTTIs.

For a resource pool, one lTTI is divided into N SA resources of the lTTI, and one sTTI is divided into M SA resources of the sTTI. During a period of time corresponding to one lTTI, the number of SAs to be sensed by the UE is L=N+m·M, wherein m is the number of sTTIs obtained through dividing the lTTI. The number of SAs that can be sensed by the UE during a period of time corresponding to one lTTI depends on the capability of the UE. For a UE with a higher capability, the number of SAs that can be sensed by the UE is larger than or equal to L, and the UE may sense each possible SA resource. Suppose the capability of the UE is limited, that is, the number of SAs that can be sensed by the UE is smaller than L, a rule may be defined in which the UE may select to-be-sensed SAs. In one possible rule, different sensing priorities may be defined for TTIs with different lengths. For example, the UE first ensures that SA resources of all lTTIs can be sensed, and then the remained capability of the UE is used to sense SA resources of sTTIs. For example, suppose V2X messages related to security are transmitted in a lTTI, the SA resources of the lTTI need to be sensed firstly. Or, in another rule, the number LL of SA resources of the lTTI to be sensed by the UE and the number LS of SA resources of the sTTI to be sensed by the UE are determined respectively. The parameters LL and LS may be configured by a base station or pre-configured, or may be predefined in a standard according to a UE capability. Or, suppose the maximum number of SA resources that can be sensed by the UE in one lTTI is Lmax, in another rule, the number LL of SA resources of the lTTI to be sensed by the UE is determined, and the remained SA sensing capability, i.e., Lmax-LL, is used to process the SA resources of the sTTI. The parameter LL may be configured by a base station or pre-configured, or may be predefined in a standard according to a UE capability.

In addition, the number of PRBs that can be decoded by the UE also depends on the capability of the UE. The number of PRBs refers to the number of PRBs of data channels, or the number of PRBs including SAs and data channels. The capability of the UE about how many PRBs can be sensed may be defined only according to the TTI with one length, for example, the lTTI, and may be converted into the capability of the UE defined according to the TTI with another length. Or, the capability of UE about how many PRBs can be sensed may be defined according the TTI of each length. If the capability of the UE about how many PRBs can be sensed is defined according the TTI with one length, the capability of the UE may be only used to sense the PRB of the TTI with this length. Or, if the capability of the UE about how many PRBs can be sensed is defined according the TTI with one length, the capability of the UE may be converted into the capability of the UE used for sensing the PRBs of TTIs with other lengths. For example, if the number of PRBs that can be sensed by the UE in one lTTI is N, the number of PRBs that can be sensed by the UE in one sTTI may be defined as c·N, wherein c is a coefficient related to the relative length of the sTTI and the lTTI, for example, c is equal to 2. Suppose the capability of the UE is limited, a rule may be defined in which the number of the PRBs to be sensed according to TTIs with different lengths is determined by the UE. In one possible rule, different sensing priorities may be defined for TTIs with different lengths. For example, the UE first ensures that PRBs of all lTTIs can be sensed, and then the remained capability of the UE is used to sense PRBs of sTTIs. For example, suppose V2X messages related security are transmitted in a lTTI, the PRBs of the lTTI need to be sensed firstly. Or, in another rule, the number LL of PRBs of the lTTI to be sensed by the UE and the number LS of PRBs of the sTTI to be sensed by the UE are determined respectively. The parameters LL and LS may be configured by a base station or preconfigured, or may be predefined in a standstand according to a UE capability. Or, suppose the maximum number of PRBs that can be sensed by the UE in one lTTI is Lmax, in another rule, the number LL of PRBs of the lTTI to be sensed by the UE is determined, and the remained sensing capability of the UE is used to process the PRBs of sTTIs, that is, the sensing capability corresponding to the PRBs of Lmax-LL lTTIs are used to process the PRBs of sTTIs. The parameter LL may be configured by a base station or preconfigured, or may be predefined in a standstand according to a UE capability.

According to the above method, the disclosure also provides an apparatus. The apparatus may implement the above method. As shown in FIG. 12, the apparatus includes a sensing module, a resource selecting module and a receiving-transmitting module.

The sensing module is applied to a UE to sense SA of another UE in a sensing window based on TTIs with different lengths in a resource pool, measure a receiving power of a scheduled data channel based on the SA, and sense a receiving energy of each sub-channel of each subframe.

The resource selecting module is applied to the UE to select resources for data transmission according to the SA, the receiving power and the receiving energy.

The receiving-transmitting module is applied to the UE to transmit the SA to indicate the selected resources, and perform data transmission on the resources.

Those skilled in the art can understand that all or part of processes in the method provided by the embodiments of the disclosure can be implemented by instructing related hardware by a program. The program may be stored in a computer-readable memory, and one or combination of processes of the above method is included when the program is operated.

In the embodiments of the disclosure, the modules may be integrated into a processing module, or may be separated physically. Or, two or more modules are integrated into a module. The above integrated module may be implemented by hardware or software. If the integrated module is implemented by software and is sold or used as an exclusive product, the integrated module may be stored in a computer-readable storage medium.

The storage medium may be a read-only memory (ROM), a disk or a compact disc (CD).

The foregoing is only preferred embodiments of the disclosure and is not used to limit the protection scope of the disclosure. Any modification, equivalent substitution and improvement without departing from the spirit and principle of the disclosure are within the protection scope of the disclosure.

To make the objectives, technical solutions, and advantages of the present invention more comprehensible, the present invention is further described in detail below with reference to the accompanying drawings and embodiments.

FIG. 17 is a flowchart according to the present invention.

Step 1701: The UE detects a physical downlink control channel (PDCCH) on a configured control resource set (CORESET).

The time resources can be divided according to a certain time unit (TU), and the TU can refer to a subframe, a slot or a mini-slot. A slot can be divided into a multiple of minislots, and a mini-slot includes one or more OFDM symbols (OSs). Within a downlink TU, the base station can configure the UE with one or more CORESETs. One PDCCH is mapped into one CORESET.

Step 1702: The UE parses the detected PDCCH and receives the PDSCH accordingly, and determines PUCCH resources for feedback of HARQ-ACK information.

For HARQ-based downlink data transmission, after receiving the data transmitted by the base station, the UE needs to feed back HARQ-ACK information accordingly, and correspondingly needs to determine the PUCCH resources for feedback of HARQ-ACK information.

Step 1703: The UE transmits HARQ-ACK information on the determined PUCCH resources, and transmits a scheduled physical uplink shared channel (PUSCH).

Here, the physical resource blocks (PRBs) used for data channel frequency hopping can avoid as much as possible resource conflicts with the resource for PUCCH transmission, when the uplink data channel supports the frequency hopping operation.

The method for processing the uplink and downlink control channel according to the present invention is described below with reference to the embodiments.

A fifth embodiment is described as follows.

The UE can transmit a multiple of types of uplink control information (UCI) in an uplink direction, such as, a periodic channel state indication CSI (P-CSI), a scheduling request (SR) and HARQ-ACK information. PUCCH formats used to bear different types of UCI are generally different. The above-described PUCCH resources can be defined on part of or all of the uplink OSs in a TU; or, the above-described PUCCH resources can also be defined in a multiple of TUs to increase the coverage. Depending on an uplink and downlink structure of the TU, the number of OSs for bearing PUCCH resources in one TU can be variable. For example, assuming that a TU includes seven OSs and the TU can be completely used for uplink transmission, so that the number of OSs for PUCCH resources is 7. A TU can include one downlink area for transmitting PDCCH, and the remaining part is used for uplink transmission. Assuming that two OSs are used to bear the PDCCH, then the number of OSs for the PUCCH resource is 5. For a case of unit time-frequency resource being multiplexed by code division multiplexing (CDM), for example, for a case of a multiple of PUCCH channels being multiplexed on a PRB of a TU, the number of PUCCH channels which can be multiplexed on the above-described unit time-frequency resource can also be variable, when the number of OSs for PUCCH resources in the TU changes.

For a PUCCH format, assuming that PUCCH resources are defined in all PRBs which can be used for PUCCH transmission, and it is determined by base station that the base station actually allocates which PUCCH resources in which PRB. The number of PUCCH resources multiplexed in a unit time-frequency resources is denoted as A, and PRBs which can be used for PUCCH transmission can be divided into B unit time-frequency resources described in the above. The total number of PUCCH resources supporting the PUCCH transmission is A×B, and the index range of which is $n_{PUCCH}^{(x)}=0,1,\ldots,A\times B-1$. For example, in the LTE system, for PUCCH format 3, five channels can be multiplexed in one PRB, which corresponds to a maximum bandwidth of 110 PRBs. The index of resources for PUCCH format 3 can be ranged from 0 to 549. Based on the above analysis, when the number of OSs for PUCCH transmission in a TU changes, the number of PUCCHs which can be multiplexed in the above unit time-frequency resource can also be variable, for example, changes from A to a. At this time, the total number of PUCCH resources supporting the PUCCH transmission accordingly changes to a×B, the index range of which is $n_{PUCCH}^{(x)}=0,1, \ldots, a\times B-1$. Corresponding to different values of the number of OSs used for PUCCH transmission, the number of PUCCH resources multiplexed in one unit time-frequency resource can be predefined, can be calculated according to the number of OSs used for PUCCH transmission, or can be configured by a higher-layer signaling. For a UE, the index of the PUCCH resource allocated by the UE is denoted as n, and the above-described allocated index n is not changed with the number of OSs used for PUCCH transmission. In this way, PUCCH resources allocated to this UE always exist as long as the condition n≤min(A×B−1, a×B−1) is satisfied. The allocated PUCCH resources still do not conflict when the number of OSs for PUCCH transmission changes, as long as the scheduling of the base station ensures that the indexes n of the PUCCH resources allocated by UEs do not conflict.

For a PUCCH format, the number of PUCCHs which can be multiplexed in the above-described unit time-frequency resource can also be variable, when the number of OSs for PUCCH resources in a TU changes. For different PUCCH formats, the number of multiplexed PUCCHs may change in different proportions. As shown in FIG. 18 (*a*), it is assumed that b PRBs are allocated for the PUCCH format 1 channel starting from the PRB index 0, then several PRBs are allocated for the PUCCH format 2 channels starting from the PRB index b. The PUCCH areas are contiguous and the remaining resources are used for data transmission, since the resources of the two PUCCH formats are allocated contiguous PRBs. As shown in FIG. 18 (*b*), when the number of OSs for the PUCCH resources in a TU changes, it is assumed that the number of the PUCCH resources multiplexed in the two PUCCH formats change in the same proportion, for example, both reduced by half, then the both newly added coefficients of the number of the PRB occupied are 2, in order to bear the same number of PUCCH resources. That is, 2*b* PRBs need to be allocated for PUCCH format 1, and PRBs are used for PUCCH format 2 starting from PRB index 2b. The PUCCH areas are contiguous and the remaining resources are used for data transmission, since the resources of both PUCCH formats are still allocated continuous PRBs. As shown in FIG. 18(*c*), when the number of OSs for PUCCH resources in a TU changes, it is assumed that the number of PUCCH resources multiplexed in one PRB in two PUCCH formats changes in different proportions, for example, ⅔ and ⅓, wherein the coefficient of the number of the PRBs occupied by PUCCH Format 1 is 1.5, and the coefficient of the number of the PRB occupied by PUCCH format 2 is 3, in order to bear the same number of PUCCH resources. The number of PRBs occupied by PUCCH format 1 is about 1.5b, while the PRBs used for PUCCH format 2 is start from the PRB index 3b, then there is approximately an interval of 1.5b PRBs between the two PUCCH formats. The PRBs in this interval are not contiguous with other PRBs used for data channels, thereby affecting the flexibility of resource allocation.

According to the analysis of FIG. 18, when the number of OSs for PUCCH resources in a TU changes, it is assumed that the number of PUCCH resources multiplexed in one PRB in two PUCCH formats change in different proportions, data channel fragmentation is possible caused, if the time-frequency resources to which the PUCCH resources are mapped is determined according to each PUCCH format independently.

In order to avoid the above situation, when the number of OSs for the PUCCH resources in one TU changes and it is necessary to adjust the time-frequency resource to which the PUCCH resource is mapped, a starting point of the channel to which the second type of PUCCH format is mapped is determined according to an ending point of the channel to which the first type of PUCCH format is mapped. For example, when the last PUCCH resource of the first type of PUCCH format is mapped to PRB x, the PUCCH resource of the second type of PUCCH format should be mapped from PRB x or PRB x+1 to avoid the fragmentation. According to the above-described starting point, the PUCCH resource whose index is 0 in the second type of PUCCH format can be determined.

Or, a parameter $N_{RB}^{(2,ref)}$ can be configured by using a higher-layer signaling. When the number of OS for PUCCH resources in a TU changes, the parameters $N_{RB}^{(2)}$ are obtained according to the above-described the number of OSs (e.g., L) for the PUCCH and a parameter $N_{RB}^{(2,ref)}$. The parameter $N_{RB}^{(2)}$ can indicate an ending PRB to which the first type of PUCCH format is mapped, and a starting PRB to which the second type of PUCCH format is mapped can be the next PRB of the above-described ending PRB; or, the parameter $N_{RB}^{(2)}$ can also indicate the starting PRB to which the second type of PUCCH format is mapped. The above-described starting PRB includes a PUCCH resource whose index in the second type of PUCCH format is 0. For example, according to the number of OSs (e.g., L) for PUCCH of a TU and a reference value L0 of the number of OSs for the PUCCH resource, the proportion of the change in the number of PUCCH resources multiplexed in one PRB in the first type of PUCCH format p=f(L,L0) can be obtained, for example, p=f(L,L0), or, the proportion p is calculated according to the number of PUCCH resources multiplexed on one unit time-frequency resource corresponding to the number of OSs for the PUCCH. Further, a parameter $N_{RB}^{(2)}=g(N_{RB}^{(2,ref)},p)$ is obtained according to the proportion p and the parameter $N_{RB}^{(2,ref)}$, for example, $N_{RB}^{(2)}=\lfloor N_{RB}^{(2,ref)} \cdot p \rfloor$ or $N_{RB}^{(2)}=\lceil N_{RB}^{(2,ref)} \cdot p \rceil$.

Or, for a PUCCH format, an offset $N_{PUCCH}^{offset}$ of an index of a PUCCH resource can be configured. The $N_{PUCCH}^{offset}$ depends on the number of OSs for bearing one PUCCH resource. For a type of PUCCH format, each different number of OSs for bearing PUCCH resource can be respectively configured with an $N_{PUCCH}^{offset}$; or, the number of OSs for PUCCH resources can be divided into sets. For example, each set includes some similar number of OSs, and each set is respectively configured with an $N_{PUCCH}^{offset}$. Assuming that an index of PUCCH resource configured by a higher-layer signaling is n, the index of PUCCH resource of the actually configured UE in one TU is $nk+N_{PUCCH}^{offset}$. Assuming that PUCCH resources are indicated by an ARI-based mechanism, N PUCCH resources are configured by a higher-layer signaling and one of the N PUCCH resources is indicated by the ARI. The above-described N PUCCH resources are nk, wherein, k=0,1, . . . N−1, then the index of PUCCH resource of the actually configured UE in one TU is $nk+N_{PUCCH}^{offset}$. In this way, the index 0 of PUCCH resource can be fixedly mapped to a PRB, for example, PRB index 0.

A sixth embodiment is described as follows.

For HARQ-based downlink data transmission, after receiving the downlink data, the UE can feed back the HARQ-ACK information by the PUCCH resource. In addition, the UE also needs to report periodic CSI (P-CSI) information to the base station through the PUCCH resource. The above-described PUCCH resources can be defined on part of or all of the uplink OSs in a TU, or the above-described PUCCH resources can also be defined in a multiple of TUs to increase the coverage. Depending on an uplink and downlink structure of the TU, the number of OSs which can be used for bearing PUCCH resources in one TU can be variable. For example, assuming that a TU includes seven OSs and the TU can be completely used for uplink transmission, so that the number of OSs for PUCCH resources is 7. A TU can include one downlink area for transmitting PDCCH, and the remaining part is used for uplink transmission. Assuming that two OSs are used for bearing the PDCCH, the number of OSs for the PUCCH resource is five. In a case that a certain amount of UCI payload is borne, the number of PRBs occupied by the PUCCH resources can increases correspondingly so as to ensure the transmission performance of the PUCCH resources, when the number of OSs for PUCCH resources in a TU decreases.

For each PUCCH resource, a PRB resource occupied by the PUCCH can be configured, for example, a starting PRB occupied by the PUCCH resource and the number of PRBs continuously occupied can be configured. In addition, other parameters of the PUCCH resources can also be configured. Or, it is assumed that the number of PRBs occupied by one PUCCH resource is fixed, for example, one PRB, the total number of PRBs for bearing PUCCH resources changes correspondingly according to the change of the number of multiplexed PUCCH resources in one PRB, when the number of OSs for bearing PUCCH resources changes. It is assumed that a multiple of PUCCH formats exist, the number of bits of payload which can be borne by the multiple of PUCCH formats are different. The above-described multiple of PUCCH formats can include a PUCCH mapped to a relatively small number of OSs, for example, one or two OSs, which are referred to short PUCCHs; and a PUCCH mapped to a relatively large number of OSs, for example, equal to or greater than four OSs, which are referred to long PUCCHs. Or, the above-described multiple of PUCCH formats can also refer only to different formats of long PUCCHs. The number of OSs of the above-described multiple of PUCCH formats can be variable. Or, one part of the OS data of the PUCCH format can be variable, and the other part of OS data of the PUCCH format can be fixed. For example, PUCCH format 3 in LTE bears less than or equal to 22 bits while PUCCH format 4 can bear more bits, so that PUCCH format 3 or PUCCH format 4 is selected for UCI transmission according to the number of bits of UCI.

For HARQ-based downlink data transmission, an ARI-based mechanism can be used to indicate PUCCH resources. That is, a set of candidate PUCCH resources is configured by a higher layer, and one PUCCH resources of the above-described set is dynamically indicated by an ARI in a PDCCH. The following describes a method for configuring PUCCH resources indicated by the ARI according to the present invention.

The first method for configuring PUCCH resources is to configure N PUCCH resources by a higher-layer signaling which is independently of the number of OSs for bearing the PUCCH resources and then adjust the above-described configured N PUCCH resources according to the number of OSs used for the PUCCH. The starting PRB index of the nth configured PUCCH resource is denoted as Sn which occupies Rn PRBs, wherein, n=0,1, ... N−1. The number of OSs currently used for the PUCCH resources is denoted as L, then the above-described configured nth PUCCH resource can be adjusted to continuously occupy $R_n = f(R_n, L, L_0)$ PRBs starting from the starting PRB index Sn, wherein, L0 is the number of OS for reference. For example, assuming that the PUCCH resources are mapped into a TU and the TU includes 7 OSs, then L0 is equal to 7, $R_n' = \lfloor R_n \cdot L/L_0 \rfloor$ or $R_n' = \lceil R_n \cdot L/L_0 \rceil$. When a multiple of PUCCH formats exists, PUCCH resources are respectively configured for each PUCCH format. When the above-described configured N PUCCH resources are respectively adjusted according to the number of OSs used for PUCCH, the number of bits of payload which can be borne by the N PUCCH resources changes accordingly, the PUCCH formats suitable for UCI transmission can also change possibly. That is, the PUCCH format to be used can be determined according to the number of bits of UCI and the number of OSs used for PUCCH so as to further determine the available N PUCCH resources. The ARI indicates one of the above-described N PUCCH resources.

A second method for configuring PUCCH resources is to configure a set of PUCCH resources by higher-layer signaling according to different number of OSs for bearing PUCCH resources respectively, wherein, each set of PUCCH resources includes N PUCCH resources. The above-described one set of PUCCH resources is respectively configured for each different number of OSs for PUCCH resource, or, the number of OSs for PUCCH resources can be divided into sets, for example, each set including some similar number of OSs, and one set of PUCCH resources is respectively configured for each set of the number of OSs. When a multiple of PUCCH formats exist, PUCCH resources can be respectively configured for each PUCCH format. The number of bits of payload which can be borne by the PUCCH format of each PUCCH format can be determined according to the number of OSs used for bearing the PUCCH, and the PUCCH format used for UCI transmission can also change possibly. That is, the PUCCH format needs to be used can be determined according to the number of bits of UCI and the number of OSs used for PUCCH. A corresponding set of PUCCH resources can be obtained according to the number of OSs currently for bearing the PUCCH so as to indicate one of the above-described set of N PUCCH resources by using the ARI.

A third method for configuring PUCCH resources is to configure a multiple sets of PUCCH resources by a high-layer signaling, wherein, the above-described each set of PUCCH resources includes N PUCCH resources. For example, each above-described set of PUCCH resources can correspond to a number of OSs or multiple of the number of OSs for bearing PUCCH resources. The ARI indicates one set of PUCCH resources to be used. In this method, the ARI actually bears the information on the number of OSs for bearing the PUCCH resources. For example, assuming that a structure of a TU is indicated by a public DCI dynamically, the UE does not receive the public DCI of the TU where the PUCCH resources are located while generating the UCI and needing to process the UCI, therefore, the UE possibly does not know the number of OSs which can be used for PUCCH transmission of the TU. In this way, the UE can know the number of OSs for bearing the PUCCH resources by the ARI so as to start to process the UCI.

The number of OSs for bearing the PUCCH resources obtained by the ARI is possibly different from the information indicated by the public DCI of the TU where the PUCCH resource is located. Specifically, the ARI can only indicate a range of the number of OSs for bearing PUCCH resources. The UE can process the UCI according to the number of OSs indicated by the ARI. The actual number of OSs available for bearing PUCCH resources can be obtained according to the information indicated by the public DCI. The UE can transmit the PUCCH according to the actual number of OSs available for bearing the PUCCH resources. Or, when the actual number of OSs available for bearing PUCCH resources is greater than or equal to the number of OSs indicated by the ARI, the UE can transmit the PUCCH only according to the number of OSs indicated by the ARI; otherwise, the UE transmits the PUCCH according to the actual number of OSs available for bearing PUCCH resources.

When a multiple of PUCCH formats exist, PUCCH resources can be respectively configured for each PUCCH format. The number of OSs for bearing the PUCCH is determined according to the ARI, and further the number of bits of payload which can be borne by the PUCCH resources of each PUCCH format is determined. The PUCCH format suitable for UCI transmission can also change. That is, the PUCCH format to be used can be determined according to the number of bits of UCI and the ARI. The ARI indicates one set of PUCCH resources, and further indicates one PUCCH resource in the above-described set of PUCCHs.

In a third method for configuring PUCCH resources, an ARI indicates both one set of PUCCH resources and one resource of N resources in the set. Or, one set of PUCCH resources to be used in the DCI can also be indicated by a field which actually bears information about the number of OSs for bearing the PUCCH resources; and another field is used to indicate one of N resources within one set of PUCCHs.

A fourth method for configuring PUCCH resources is to configure a multiple sets of PUCCH resources by a high-layer signaling, wherein, each set of PUCCH resources includes N PUCCH resources. Which set of PUCCH resources is used can be determined according to the combination of the number of OSs for bearing PUCCH resources and ARI indication information. For a case of the number of OSs for bearing the PUCCH resources, the above-described case can be a number of OSs or multiple of number of OSs, one set of PUCCH resources can be further determined by the ARI. When a multiple of PUCCH formats exist, PUCCH resources can be configured for each PUCCH format. The number of bits of payload which can be borne by the PUCCH resources of each PUCCH format is determined according to the number of OS used for bearing PUCCH and the ARI, and the PUCCH format suitable for UCI transmission can also change. That is, the PUCCH format to be used can be determined according to the number of bits of UCI, the number of OSs used for bearing the PUCCH and the ARI. One set of PUCCH resources can be indicated by the combination of the number of OSs for bearing the PUCCH and the ARI, and one PUCCH resource in the above-described one set of PUCCHs is further indicated.

For P-CSI, a set of candidate PUCCH resources can be configured by a higher-layer signaling. The above-described set can include one or more PUCCH resources, and the above-described PUCCH resources can belong to one or more types of PUCCH formats, so that a suitable PUCCH resource is selected according to the current number of bits of UCI in combination with other information.

The first method for configuring PUCCH resources is to configure a set of PUCCH resources by a high-layer signaling, which is independently of the number of OSs for bearing the PUCCH resources. The above-described one set of PUCCH resources can include one or more PUCCH resources, which can belong to a same or different PUCCHs formats, and the above-described configured one set of PUCCH resources is adjusted according to the number of OSs for the PUCCH. The starting PRB index of the nth configured PUCCH resource is denoted as Sn which occupies Rn PRBs, wherein, n=0,1, . . . N−1; N is the number of PUCCH resources of one above-described set of PUCCH resources; the current number of OSs used for PUCCH resources is denoted as L. Then the above-described configured nth PUCCH resource can be adjusted to continuously occupy $R_n'=f(R_n,L,L_0)$ PRBs starting from the starting PRB index Sn, wherein, L0 is the number of OSs for reference. For example, assuming that the PUCCH resources are mapped into a TU and the TU includes 7 OSs, then L0 is equal to 7, $R_n'=\lfloor R_n \cdot L/L_0 \rfloor$ or $\lceil R_n \cdot L/L_0 \rceil$. When the above-described configured one set of PUCCH resources is adjusted according to the number of OSs for PUCCH, the number of bits of payload which can be borne by the above-described one set of PUCCH resources changes accordingly. When the PUCCH resources of the above-described one set of PUCCH resources belong to a same PUCCH format, one PUCCH resource to be used is determined according to number of bits of UCI and the number of OSs for PUCCH. When the PUCCH resources of the above-described one set of PUCCH resources belong to a multiple of PUCCH formats, the PUCCH format suitable for UCI transmission can also possibly change. That is, the PUCCH format to be used and one PUCCH resource to be used are determined according to the number of bits of UCI and the number of OSs used for PUCCH.

The second method for configuring PUCCH resources is to respectively configure a set of PUCCH resources by using a higher layer signaling according to different number of OSs for bearing PUCCH resources respectively. The above-described one set of PUCCH resources can include one or more PUCCH resources, which can belong to the same or different PUCCH formats. A set of PUCCH resources can be respectively configured for each different number of OSs of PUCCH resources or the number of OSs for PUCCH resources can also be divided into sets, for example, each set including some similar number of OSs, and a set of PUCCH resources are respectively configured for each set of the number of OSs. A set of PUCCH resources are determined according to the number of OSs for bearing the PUCCH. When the above-described one set of PUCCH resources belong to a same PUCCH format, one PUCCH resource to be used is determined according to the number of bits of UCI and the number of OSs used for PUCCH. One set of PUCCH resources is determined according to the number of OSs used for bearing the PUCCH. When the above-described one set of PUCCH resources belong to a multiple of PUCCH formats, the PUCCH format suitable for UCI transmission can also change, that is, the PUCCH format to be used and one PUCCH resource can be determined according to the number of bits of UCI and the number of OSs used for PUCCH.

A seventh embodiment is described as follows.

According to the slot of the fifth embodiment, the number of OSs for bearing PUCCH in a TU can be variable depending on an uplink and downlink structure of a TU. In a case that a certain UCI payload is borne, to achieve a same PUCCH transmission performance, the number of the PRBs occupied by the PUCCH increases, when the number of OSs for the PUCCH in one TU decreases. That is, in one TU, the actual number of the PRBs used for bearing UCI can change according to the number of OSs used for PUCCH resources in this TU.

For uplink data transmission, the frequency diversity gain can be obtained by supporting frequency hopping. In general, the larger the interval of PRBs occupied by the uplink channel, the larger the frequency diversity gain. For example, when a part of resources of uplink bandwidth is allocated for PUCCH, for example, when the PRB resources of two sides of the uplink bandwidth is used for bearing PUCCH, the frequency hopping operation of the uplink data channel needs to avoid occupying the PRBs allocated for PUCCH as much as possible. According to the above analysis, the number of the PRBs used for the PUCCH resources changes according to the number of OSs used for PUCCH in the TU. In order to avoid the conflict with a frequency hopping operation of an uplink data channel, the number of the PRBs unavailable for the frequency hopping operation of the uplink data channel changes according to the number of OSs used for PUCCH in the TU. As shown in FIG. 19, the number of PRBs used for PUCCH can change according to the change of the number of OSs for bearing the PUCCH in one TU. Correspondingly, the number of PRBs unavailable for the frequency hopping operation of the uplink data channel changes 1501~1503. The present invention does not limit whether the number of PRBs used for PUCCH resources is equal to the number of PRBs unavailable for the frequency hopping operation of the uplink data channel.

In one TU, the number of PRBs unavailable for the frequency hopping operation of the uplink data channel is denoted as $N_{RB}^{HO}$. Wherein, $N_{RB}^{HO}$ can be a value configured by a higher-layer signaling, which is independently to the number of OSs of the TU and the number of PRBs used for PUCCH resources. Or, $N'_{RB}^{HO}$ can be a value configured by a higher-layer signaling, and for one TU, $N'_{RB}^{HO}$ is adjusted according to the number of OSs for bearing the PUCCH resources of the TU to obtain $N_{RB}^{HO}$. The number of OSs for bearing PUCCH resources of one TU is denoted as L. Wherein, $N_{RB}^{HO}=f(N'_{RB}^{HO},L,L_0)$, and L0 is the number of OSs for reference. For example, assuming that PUCCH resources are mapped in a TU and the TU includes 7 OSs, then L0 can be equal to 7, $N_{RB}^{HO}=\lfloor N'_{RB}^{HO} \cdot L/L_0 \rfloor$ or $N_{RB}^{HO}=\lceil N'_{RB}^{HO} \cdot L/L_0 \rceil$. Or, corresponding $N_{RB}^{HO}$ can be configured by a higher-layer signaling for different values of the number of OSs for bearing PUCCH resources; or the number of OSs for bearing PUCCH resources can be divided into sets, for example, the number of OSs contained in each set are, and corresponding $N_{RB}^{HO}$ is configured for each set of the number of OSs.

An eighth embodiment is described as follows.

Both the base station and the UE can support the broadband transmission capability, for example, a bandwidth of a carrier can reach 100 MHz. Or, the bandwidth capabilities of the base station and the UE can be different, for example, the base station supports a broadband of 100 MHz bandwidth to operate as one carrier, and the single carrier capability of the UE is only 20 MHz, but 100 MHz can be obtained by aggregating five carriers. In order to support the UE with relatively low bandwidth capability, 3GPP introduces a concept of bandwidth part (BWP). For example, a carrier of 100 MHz bandwidth can be divided into five 20 MHz BWPs so that each BWP can bear UEs with relatively low bandwidth capabilities. In general, by configuring BWP, one UE can be enabled to operate on one or more subbands of the entire carrier. The above-described UE can be a UE with low bandwidth capability or a UE with high bandwidth capability.

On a carrier, when multiple of BWPs are configured for a UE, the BWPs can be the scheduled BWP indicated in the PDCCH. In addition, when a multiple of carriers are configured for the UE, the carriers can be the scheduled carriers indicated in the PUCCH. In generally, assuming that a multiple of carriers are configured for a UE and one or more BWPs are configured for each carrier, the carriers can be scheduled carriers indicated in PDCCH, and the BMP can be scheduled BWP indicated in the PUCCH. In the DCI format, the information indicating the carrier and the information indicating BWP can be independent fields or can be a joint field for indicating the carrier and BWP. The carrier and the BWP corresponding to each codeword in the above-described joint field can be configured by a higher-layer signaling. In this way, the overhead for indicating the carrier and BWP can be reduced as much as possible.

The PDCCH transmitted in one TU can also schedule data transmissions in one or more TUs. In the DCI format, information indicating the TU and information indicating the BWP can be independent fields, or it can also be a joint field for indicating the TU and BWP. The TU and the BWP corresponding to each codeword in the above-described joint field can be configured by a higher-layer signaling. In this way, the overhead for indicating the TU and BWP can be reduced as much as possible. Further, in the DCI format, the information indicating the carrier, the information indicating the TU and the information indicating the BWP can be independent fields, or it can be a joint field for indicating the carrier, TU and BWP. The carrier, TU and BWP corresponding to each codeword in the above-described joint field can be configured by a higher-layer signaling. In this way, the overhead for indicating the carrier, the TU and the BWP can be reduced as much as possible.

A ninth embodiment is described as follows.

The base station can configure one or more CORESETs for bearing the PDCCH. One above-described CORESET corresponds to one set of time-frequency resources. For example, frequency resources are allocated by using PRB as granularity, and time resources are allocated by using TU as granularity. A TU can refer to a subframe, a slot or a mini slot. A PDCCH is mapped into a CORESET. A CORESET generally can bear a multiple of candidate PDCCHs with the same or different aggregation levels. In order to reduce the number of blind detections, the UE can only detect a part of candidate PDCCHs of one CORESET.

The UE generally detects two DCI formats during data transmission, that is, a fallback DCI format, which is used to enhance the reliability of DCI transmission; and a transmission mode-related DCI format, which is used to match the channel characteristics by using a certain transmission mode to improve the downlink transmission performance. For a UE, in order to reduce the blind detection overhead, a search space for the UE to detect the PDCCH can be defined. The configuration of the above-described search space comprises the number of the candidate PDCCHs configured corresponding to each CORESET. Or, the configuration of the above-described search space comprises the number of candidate PDCCHs corresponding to each possible aggregation level. Or, the configuration of the above-described search space can further comprise the number of candidate PDCCHs corresponding to each possible aggregation level, which is configured for each different DCI format, respectively.

For a UE, a CORESET can be respectively configured by distinguishing DCI formats. That is, one or more CORESETs which bears the above-described DCI formats can be configured for one DCI format or a part of the DCI formats. For a configured CORESET, the number of the blind detection of each aggregation level of the above-described DCI format on the CORESET is further configured. Or, the number of the blind detection of each aggregation level of the above-described format on the CORESET is predefined, for example, the number of the blind detection of each aggregation level of one DCI format on the CORESET is predefined according to the total number of the time-frequency resources of this CORESET. The above-described multiple of CORESETs configured for different DCI formats can be overlapped or partially overlapped, thereby reducing the overhead of the channel estimation and demodulation of the UE. Specifically, the COREST of one DCI format can be a subset of the CORESET of the other DCI format.

Or, for a UE, with respect to a configured CORESET, DCI format which can be borne by this CORESET is further configured. One CORESET is only used to bear one DCI format, a part of DCI formats or the all of DCI formats of this UE. For the above-described borne DCI format, the number of the blind detection of each aggregation level is further configured. Or, the number of the blind detection of each aggregation level of one DCI format on the CORESET is predefined, for example, the number of the blind detection of each aggregation level of one DCI format on the CORESET is predefined according to the total number of the time-frequency resources of this CORESET. The above-described multiple of CORESETs configured for bearing different DCI formats can be overlapped or partially overlapped, thereby reducing the overhead of the channel estimation and demodulation of the UE. Specifically, one COREST can be a subset of another CORESET.

Using the above-described method, CORESET bearing a fallback DCI format can be sparser than the CORESET bearing the transmission mode-related DCI format, for example, one subset, thereby reducing the overhead of blind detection under the premise that the fallback DCI format can still be transmitted. Or, the decreased blind detection capability for detecting the fallback DCI format can be used to detect more transmission mode-related DCI formats, thereby improving the flexibility of which the base station allocates the PDCCH for bearing the transmission mode-related DCI format. As shown in FIG. 20, assuming that two CORESETs are configured for the UE, the transmission mode-related DCI format can be borne by using CORESET 1, and the fallback DCI format can be borne by using CORESET 2. Or, CORESET 1 bears the fallback DCI format and the transmission mode-related DCI format, however, CORESET 2 only bears the transmission mode-related DCI format.

Depending on the configuration of the CORESET by the base station, the CORESET configuration of the UE configured by the base station and its number can be variable in one timing position, for example, in one slot. Correspondingly, the number of the blind detection to be performed by the UE is also variable. By using the above method of the present invention, the number of blind detections of the CORESET and/or DCI formats at one timing position can be configured by a higher-layer signaling or pre-defined regardless of the influence of the above-described change of CORESET at different timing position. Or, for a timing position, the number of blind detections of each CORESET and/or DCI format of the above-described timing position can be adjusted so that the total number of blind detections is equal to or close to the allowed maximum number of blind detections. Or, the number of blind detections is adjusted so that the total number of blind detections is equal to or close to the allowed maximum number of blind detections, only when the total number of blind detections of each CORESET and/or DCI format in one timing position exceeds the allowed maximum number of blind detections. The above-described adjustment of the number of blind detections of each CORESET and/or DCI format can be processed on a UE specific search space (USS) of UE only.

For USS, the maximum number of blind detections for all CORESETs of all component carriers (CCs) can be determined. Correspondingly, the above-described operation of adjusting the number of blind detections of each CORESET and/or DCI format can be a joint processing on all CORESETs of all CCs so that the total number of blind detections is equal to or close to the maximum number of blind detections; or, the number of blind detections is adjusted so that the total number of blind detections is equal to or close to the maximum number of blind detections, only when the total number of blind detections exceeds the maximum number of blind detections. The above-described maximum number of blind detections can be configured by a higher-layer signaling, predefined, or indicated dynamically by a public PDCCH, or can be calculated according to some other parameters. For example, for the USS, assuming that the reference number of blind detections for each CC is N, the maximum number of blind detections for C CCs is N·C; or, assuming that the total number of BWPs configured on C CCs is B and assuming that the reference number of blind detections for each BWP is M, the maximum number of blind detections is M·B. The above-described parameters N and/or M can be configured by a higher-layer signaling or predefined.

Or, for the USS, the maximum number of blind detections can also be determined for each CC respectively. Correspondingly, the above-described operations of adjusting the number of blind detections of each CORESET and/or DCI format can also be processed for each CC respectively. For each CC, the total number of blind detections of this CC is made to be equal to or close to the maximum number of blind detections; or, the number of blind detections is adjusted so that the total number of blind detections is equal to or close to the maximum number of blind detections only when the total number of blind detections of this CC exceeds the maximum number of blind detections. The above-described maximum number of blind detections can be configured by a higher-layer signaling, predefined, or indicated dynamically by a public PDCCH, or can be calculated according to some other parameters. For example, for the USS, assuming that the reference number of blind detections for each CORESET is N, and C CORESETs are configured on this CC, then the maximum number of blind detections for CC is N·C; or, it is assumed that B BWPs are configured on one CC and the reference number of blind detections for each BWP is M, then the maximum number of blind detections for this CC is M·B. The above parameters N and/or M can be configured or predefined by a higher-layer signaling or predefined.

Or, for the USS or for a set of CORESETs, the maximum number of blind detections of this set of CORESETs is determined. Accordingly, the above-described operation of adjusting the number of blind detections of each CORESET and/or DCI format can also with respect to a set of CORESETs so that the total number of blind detections of this set of CORESETs is equal to or close to the maximum number of blind detections; the number of blind detections is adjusted so that the total number of blind detections is equal to or close to the maximum number of blind detections, only when the total number of blind detections exceeds the maximum number of blind detections. The above-described maximum number of blind detections can be configured by a higher layer signaling, predefined, indicated dynamically by a public PDCCH, or can be calculated according to some other parameters. For example, for the USS, assuming that the reference number of blind detections for each CORESET is N, and the above-described one set includes C CORESETs, the maximum number of blind detections of this set of CORESETs is N·C; or, assuming that the above-described one set of CORESETs is used for scheduling B BWPs and assuming that the reference number of blind detections for each BWP is M, then the maximum number of blind detections for this CC is M·B. The above-described parameters N and/or M can be configured by a higher-layer signaling or predefined.

When the number of blind detections in one timing position is to be adjusted, the adjustment on the number of blind detections of one or more CORESETs can be prioritized according to a specific priority. The above-described priority can be configured by a higher-layer signaling or predefined. Or, the adjustment on the number of blind detections of one or more DCI formats can be prioritized according to a specific priority, and the above-described priority can be configured by a higher-layer signaling or predefined. Or, the adjustment on the number of blind detections of one or more aggregation levels can be prioritized according to a specific priority, and the above-described priority can be configured by a higher-layer signaling or predefined.

The number of blind detection of one aggregation level of one DCI format of one CORESET in a timing position is denoted as x and a coefficient for adjusting the number of blind detection is denoted as c, the number of blind detections after adjustment can be round (c·x). The above-described parameter c can be the number of blind detections only used for adjusting the USS.

The above parameter c can be used for all the CCs. The parameter c can be configured by a higher-layering signaling, for example, the number of activated CCs can be configured correspond to c; or the number of CORESETs in a timing position can be configured to correspond to c; or, the number of activated BWPs configured to correspond to c. Or, c can be dynamically indicated on a public PDCCH. Or, c can also be obtained according to other parameters. For example, if the maximum number of blind detections of the UE in a timing position is denoted as N and the total number of blind detections before adjustment at this timing position is denoted as n, then c=n/N.

The above-described parameter c can be determined for each CC respectively. The parameter c can be configured by a higher-layering signaling. For example, for each CC, the number of CORESETs in a timing position can be configured to correspond to c. Or, the c can be dynamically indicated on a public PDCCH. Or, c can also be obtained according to other parameters. For example, for a CC, the maximum number of blind detections of the UE in a timing position is denoted as N, and the total number of blind detections before adjustment in this timing position is n, then c=n/N.

The above-described parameter c can be determined for each set of CORESETs respectively. The parameter c can be configured by a higher layer signaling. For example, for each set of CORESETs, the number of CORESETs in a timing position can be configured to correspond to c. Or, the c can be dynamically indicated on a public PDCCH. Or, the c can also be obtained according to other parameters. For example, for one set of CORESETs, the maximum number of blind detections of the UE in a timing position is denoted as N, and the total number of blind detections before adjustment in this timing position is n, then c=n/N.

A tenth embodiment is described as follows.

When an uplink wideband component carrier (CC) is divided into a multiple of BWPs, depending on the resource allocation strategy of the base station, interference scenarios on different BWPs can be different. For uplink control/data transmission, differences in interference scenarios result in the changes in uplink transmission power of suitable UE. The UE can respectively process the uplink transmission power control for each BWP; or, the UE can process the uplink transmission power control for a set of BWPs; or, the UE can still process the uplink transmission power control using a CC as unit. For a UE, different BWPs can be configured with different services on one CC, and UE can process the uplink transmission power by distinguishing BWPs, so that the processes of transmission power for different reliability requirements of different services are achieved. On a CC, different BWPs can be configured to use different waveforms, that is, OFDM or OFDM of discrete fourier transform spreading (DFT-S-OFDM), so that processes of transmission power for different waveforms are achieved by processing the uplink transmission power by distinguishing BWPs. On one CC, different BWPs can be configured to use different system parameters, such as, a subcarrier interval and/or slot length or the like, so that the processes of transmission power for different system parameters are achieved by processing the uplink transmission by distinguishing BWPs.

For BWP p, the uplink transmission power Pp(i) of the UE at TU i can be determined according to the following formula:

$$P_p(i)=P_{O,p}+\alpha_p \cdot PL_p+f_p(i)+g(others). \quad (1)$$

Wherein, PO,p is a power offset parameter, which can further include two parts, in other words, the PO,p is a sum of the cell-specific parameter PO_NOMINAL,p and the UE-specific parameter PO_UE,p, that is, PO,p=PO_NOMINAL,p+PO_UE,p·αp is a parameter that controls partial or total compensation for path loss PLp·fp(i) can refer to the accumulation of transmission power control commands (TPC) in order to achieve closed-loop power control, or fp(i) can be a dynamically indicated absolute power adjustment value. g(others) is used to refer to other parameters that affect the power control, which is not limited in the present invention. For uplink control channel (such as PUCCH) and uplink data channel (such as PUSCH), the above-described parameters can be configured and processed respectively.

The above-described parameters PO,p, PO_NOMINAL,p, PO_UE,p and/or αp can be configured respectively for each BWP. Or, the above-described parameters PO,p, PO_NOMINAL,p, PO_UE,p and/or ap can be configured for a carrier and apply to each BWP of the carrier. Or, the above-described parameters PO,p, PO_NOMINAL,p, PO_UE,p and/or αp can also be configured to be used for a set of BWPs. The above-described set of BWPs can belong to only a same carrier or can belong to a multiple of carriers.

The above-described parameter fp(i) can be processed respectively for each BWP. Or, the above-described parameter fp(i) can be processed for a carrier, and can be used for each BWP of this carrier, for example, TPC for controlling and transmitting data of all BWPs of one carrier can be accumulated. Or, the above-described parameter fp(i) can also be configured and used for a set of BWPs. The above-described set of BWPs can belong to a same carrier only or can belong to a multiple of carriers. For example, TPC for the controlling and transmitting data of the above-described set of BWPs is accumulated.

For the above parameter PLp, it is necessary to determine a reference downlink signal for measuring PLp. The reference downlink signal for measuring PLp can be configured for each BWP respectively. Or, the reference downlink signal for measuring PLp can be configured for a carrier and is used for each BWP of this carrier. Or, the reference downlink signal can be configured to be used for a set of BWPs, wherein the above-described set of BWPs can belong to a same carrier only or belong to a multiple of carriers. For a carrier, the above-described reference downlink signal for measuring PLp can be a downlink signal in one BWP, for example, the above-described one BWP for measuring PLp can be configured by a higher-layer, or, can be the BWP of a synchronization channel and/or a broadcast channel received by the UE. Or, the above-described reference downlink signal for measuring PLp can also be measured based on downlink signals in one set of BWPs, wherein the above-described set of BWPs can belong to a same carrier only or can belong to a multiple of carriers. For example, the above-described set of BWPs for measuring PLp can be configured by a higher layer, or can be each BWP in one carrier.

The transmission power determined according to the above equation (1) also needs to be further limited to the permissible maximum transmission power.

A first method is that, a total power of the PUCCH and PUSCH of a UE on each BWP on one carrier c cannot exceed the maximum transmission power PCMAX,c(i). The total transmission power of the PUCCH of the UE on each BWP on the above-described carrier c can be $$P'_c(i) = \min\begin{cases} P_{CMAC,c}(i) \\ 10\log_{10}(\sum \hat{P}_{p,c}(i)), \end{cases}$$

wherein, $\hat{P}_{p,c}(i)$ is a linear value of PUCCH transmission power Pp,c(i) on one BWP, and one or more BWPs of PUCCH can be transmitted on one carrier c at the same time. When the UE does not transmit the PUCCH on the carrier c, the total transmission power of the PUSCH of the UE on each BWP of the above-described carrier c is $$P'_c(i) = \min\begin{cases} P_{CMAC,c}(i) \\ 10\log_{10}(\sum \hat{P}_{p,d}(i)), \end{cases}$$

wherein, $\hat{P}_{p,d}(i)$ is a linear value of the transmission power Pp,d(i) of the PUSCH on one BWP. When the UE transmits the PUCCH on the carrier c, the total transmission power of the PUSCH of the UE on each BWP of the above-described carrier c is $$P'_c(i) = \min\begin{cases} 10\log_{10}(\hat{P}_{CMAX,c}(i) - \hat{P}_{PUCCH}(i)) \\ 10\log_{10}(\sum \hat{P}_{p,d}(i)) \end{cases},$$

wherein, $\hat{P}_{CMAX,c}(i)$ is a linear value of the i PCMAX,c(i), $\hat{P}_{PUCCH}(i)$ is a linear value of the sum of the powers of the PUCCHs of the UE on each BWP of the carrier c.

The UE can report a PHR respectively for each BWP. For a BWP, the UE can obtain the PHR according to the transmission power of PUCCH and PUSCH on this BWP and the maximum transmission power PCMAX,c(i) of the carrier c. For a BWP, when no PUCCH exists, the PHR is the difference between PCMAX,c(i) and the transmission power Pp,d(i) of the PUSCH. For a BWP, when a PUCCH exists, one type of PHR is a difference between $\hat{P}_{CMAX,c}(i)$ and the transmission power Pp,d(i) of PUSCH, and $\hat{P}_{CMAX,c}(i)$ is the maximum transmission power without considering the influence of the PUCCH transmission. The other type of PHR is a difference between PCMAX,c(i) and the total transmission power $10\log_{10}(\hat{P}_{p,c}(i)+\hat{P}_{p,d}(i))$ of PUCCH and PUSCH. For BWPs not transmitting PUSCH, the UE can report a virtual PHR, that is, to generate transmission power of PUCCH and PUSCH according to some configured or predefined parameters and calculates the PHR. Specifically, this method can be applied to a case that each BWP on the carrier c is configured with the above-described power control parameters, respectively.

The UE can report the PHR only for the carrier c. The UE can obtain the PHR according to the transmission power of PUCCH and PUSCH on the carrier c and the maximum transmission power PCMAX,c(i) of the carrier c. When no PUCCH exists, the PHR is a difference between PCMAX,c(i) and the transmission power $10\log_{10}(\Sigma\hat{P}_{p,d})$) of PUSCH. When a PUCCH exists, one type of PHR is a difference between $\hat{P}_{CMAX,c}(i)$ and transmission power $10\log_{10}(\Sigma\hat{P}_{p,d}(i))$ of PUSCH, wherein $\hat{P}_{CMAX,c}(i)$ is the maximum transmission power without considering the influence of PUCCH transmission. The other type of PHR is a difference between PCMAX,c(i) and the total transmission power $10\log_{10}(\Sigma\hat{P}_{p,c}(i)+\Sigma\hat{P}_{p,d}(i))$ of PUCCH and PUSCH. When the carrier c does not schedule the PUSCH, the UE can report a virtual PHR, that is, UE generates a transmission power of the PUCCH and the PUSCH according to some configured or predefined parameters, and calculates the PHR. $\Sigma\hat{P}_{p,d}(i)$ is the sum of the transmission powers of the PUSCHs scheduled on each BWP of the carrier c. $\Sigma\hat{P}_{p,c}(i)$ is the sum of the transmission powers of the PUCCH scheduled on each BWP of the carrier c. Specifically, this method can be applied to a case of configuring a set of above-described power control parameters for the carrier c which is used for each BWP of the carrier c.

A second method is to configure the maximum transmission power PCMAX,p(i) of the UE on each BWP so that the total power for controlling and transmitting data on the BWP p cannot exceed the maximum transmission power PCMAX,p(i). The transmission power of the PUCCH of the UE on BWP p can be $$P'_p(i) = \min\begin{cases} P_{CMAX,p}(i) \\ P_{p,c}(i) \end{cases},$$

Pp,c(i) is the control channel transmission power calculated according to equation (1). When the UE does not transmit the control channel on BWP p, the transmission power of the PUSCH of the UE on BWP p is $$P'_p(i) = \min\begin{cases} P_{CMAX,p}(i) \\ P_{p,d}(i) \end{cases},$$

Pp,d(i) is the transmission power of PUSCH calculated according to equation (1). When a UE transmits a control channel on BWP p, the transmission power of the PUSCH of the UE on BWP p is $$P'_p(i) = \begin{cases} 10\log_{10}(\hat{P}_{CMAX,p}(i) - \hat{P}_{PUCCH}(i)) \\ P_{p,d}(i) \end{cases},$$

wherein, $\hat{P}_{CMAX,p}(i)$ is a linear value of PCMAX,p(i), $\hat{P}_{PUCCH}(i)$ is a linear value of the power of the control channel of the UE on BWP p.

Using this method, PHRs can be reported respectively for each BWP. For a BWP, when no PUCCH exists, the PHR is a difference between PCMAX,p(i) and the transmission power Pp,d(i) of PUSCH. For a BWP, when a PUCCH exists, one type of PHR is a difference between $\tilde{P}_{CMAX,p}(i)$ and the transmission power Pp,d(i) of PUSCH, and $\tilde{P}_{CMAX,p}(i)$ is the maximum transmission power without considering the influence of the PUCCH transmission. The other type of PHR is a difference between PCMAX,p(i) and the sum of transmission power Pp,c(i) of PUCCH and the transmission power Pp,d(i) of PUSCH. For BWPs not transmitting PUSCH, the UE can report a virtual PHR, that is, UE generates a transmission power of the PUCCH and the PUSCH according to some configured or predefined parameters, and calculates the PHR.

A third method is to configure a set of BWPs. The total power for controlling and transmitting data of the UE on the above-described set of BWPs cannot exceed the maximum transmission power PCMAX,g(i). The total transmission power of the control channel of the UE on the above-described set of BWPs can be $$P'_g(i) = \min\begin{cases} P_{CMAX,g}(i) \\ \sum P_{p,c}(i) \end{cases},$$

wherein Pp,c(i) is a control channel transmission power on one BWP. When the UE does not transmit the control channel on the above-described set of BWPs, the total transmission power of the data transmission of the UE on the above-described set of BWPs $$P'_g(i) = \min\begin{cases} P_{CMAX,g}(i) \\ \sum P_{p,d}(i) \end{cases},$$

is wherein Pp,d(i) is a data channel transmission power on one BWP. When the UE transmits the control channel on the above-described set of BWPs, the total transmit power of the data transmission of the UE on the above-described set of BWPs is $$P'_g(i) = \min\begin{cases} 10\log_{10}(\hat{P}_{CMAX,g}(i) - \hat{P}_{PUCCH}(i)) \\ \sum P_{p,d}(i) \end{cases},$$

wherein $\hat{P}_{CMAX,g}(i)$ is a linear value of PCMAX,g(i), $\hat{P}_{PUCCH}(i)$ is a linear value of the sum of the power of the UE on the control channel of the above-described set of BWPs.

Corresponding to the above method, the present application further discloses an apparatus, which can be used to implement the above-described method. As shown in FIG. 21, the apparatus comprises a physical downlink control channel (PDCCH) detecting and parsing module, a physical downlink shared channel (PDSCH) receiving module, a physical uplink control channel (PUCCH) generating module, and a transceiving module, wherein:

the PDCCH detecting and parsing module, configured to detect, by the UE, a downlink control information (DCI) for scheduling the PDSCH on a configured control resource set, and parse the detected DCI;

the PDSCH receiving module, configured to receive the PDSCH according to the detected DCI;

the PUCCH generating module, configured to generate a PUCCH signal to be fed back; and the transceiving module is configured to receive a downlink signal from a base station and transmit a PUCCH signal.

A person skilled in the art can understand that all or part of the steps borne in the methods of the above-described embodiments can be implemented by a program instructing a relevant hardware. Said program can be stored in a computer-readable storage medium, when executed, one of the steps of the method embodiment or a combination thereof is included.

In addition, each of the functional units in the embodiments of the present application can be integrated into one processing module, or each of the units can exist separately physically, or two or more units can be integrated into one module. The above-described integrated module can be implemented in the form of hardware or in the form of software function module. When side integrated module is implemented in the form of a software function module and is sold or used as an independent product, the integrated module can also be stored in a computer readable storage medium.

The above-described storage medium can be a read only memory, a magnetic disk, an optical disk, or the like.

The above is only the preferred embodiments of the present application and is not intended to limit the present application. Any modifications, equivalent substitutions, improvements, etc. within the spirit and principle of the present application should be included in the present application within the scope of protection.

To make the objectives, technical solutions, and advantages of the present invention more comprehensible, the present invention is further described in detail below with reference to the accompanying drawings and embodiments.

FIG. 22 is a flowchart of a method for transmitting data based on multiple antenna ports according to the present invention. The method includes the following steps:

Step 2201: The UE detects scheduling assignments (SAs) of other UEs within one time unit (TU) and generates a demodulation reference signal (DMRS) sequences of data channels which are scheduled by the correctly decoded SAs.

The above TU can refer to a subframe, a slot or a mini-slot. A mini-slot contains one or more orthogonal frequency division multiplexing (OFDM) symbols. For example, the TU in the LTE V2X system is a subframe.

Step 2202: The UE measures received power of the data channels according to the DMRS sequences.

The present invention provides the following two specific embodiments to elaborate the process for transmitting data based on multiple antenna ports of the present invention.

An eleventh embodiment is described as follows.

For a UE configured with multiple antennas, the UE can transmit data based on two antenna ports (hereinafter referred to as an MUE). It is assumed that the MUE transmits two DMRS ports, for example, by employing the transmit diversity techniques based on space time block coding (STBC), space frequency block coding (SFBC), or large-delay channel delay diversity (CDD) and the like. Correspondingly, it is necessary to define DMRS sequences of two ports. It is assumed that the two DMRS ports are multiplexed in the manner of code division multiplexing (CDM). The DMRS sequence can be determined by three parameters, that is, a root sequence, a cyclic shift (CS) and an orthogonal cover code (OCC). For one above MUE, the root sequences with the two DMRS ports can be the same, that is, the DMRS sequences are distinguished depending on the CS and/or OCC, in this case, the DMRS sequences of the two DMRS ports are orthogonal, which is beneficial to ensure the channel estimation accuracy.

The UE in the version 14 of LTE (hereinafter referred to as an SUE) transmits PSCCH and PSSCH through a single antenna port. Correspondingly, the SUE also measures the PSSCH-RSRP according to the DMRS only on the time-frequency resources of the single antenna port, which thereby to be used for processing the resource selection. It is assumed that an interference UE is an MUE, in order for the SUE to measure the PSSCH-RSRP of the MUE, the time-frequency resource of the DMRS of the MUE is the same as that of the SUE; and the DMRS sequence of at least one DMRS port of the MUE is the same as that of the SUE. In order to optimize the performance of resource selection, it is necessary to ensure that the PSSCH-RSRP measured by the SUE reflects the total power of the MUE on the two antenna ports.

One method for generating the DMRS sequences of the two DMRS ports of MUE is to distinguish the two ports only according to two OCCs if the root sequence and CS are identical. As shown in FIG. 23, it is assumed that there are two DMRS symbols in a TU, and the two DMRS ports respectively employ different OCCs of length 2, for example, [1,1] and [1,−1]. It is assumed that there are 4 DMRS symbols in a TU, the two DMRS ports respectively employ different OCCs of length 4. For example, in the LTE V2X system, two OCC codes of length 4 are defined as [1,1,1,1] and [1,−1,1,−1], and the above two OCCs ensure that OCC elements on any two adjacent DMRS symbols are orthogonal. As shown in FIG. 2, on a DMRS symbol, DMRS sequences of two DMRS ports without considering the influence of OCC both are $$\frac{P}{\sqrt{2}},$$

according to the same root sequence and CS, wherein the coefficients $$\frac{1}{\sqrt{2}}$$

are used for normalizing the power of the two antenna ports. It is assumed that the OCC elements of the two antenna ports are a and b respectively, wherein a and b are the same or different, for example, the values of a and b are 1 or −1, the signals of the two antenna ports on this DMRS symbol are $$h_1 \cdot a \cdot \frac{P}{\sqrt{2}} \text{ and } h_2 \cdot b \cdot \frac{P}{\sqrt{2}},$$

wherein, h1 and h2 are the channel gains of the two antenna ports respectively, and the superimposed signal is $$h_1 \cdot a \cdot \frac{P}{\sqrt{2}} + h_2 \cdot b \cdot \frac{P}{\sqrt{2}} (2301).$$

For convenience of analysis, it is assumed that the channel gains of two DMRS symbols are constant. Assuming that the OCC elements of the two antenna ports on the next adjacent DMRS symbol are a and −b respectively, the superimposed signal is $$h_1 \cdot a \cdot \frac{P}{\sqrt{2}} - h_2 \cdot b \cdot \frac{P}{\sqrt{2}} (2302).$$

The RSRP measured by the SUE on the above two DMRS symbols will be analyzed below. It is assumed that RSRP is measured in each DMRS symbol first and then the RSRP of two DMRS symbols are averaged, then, $$\begin{aligned}RSRP_{TXD} &= \frac{\left|\left(h_1 \cdot a \cdot \frac{P}{\sqrt{2}} + h_2 \cdot b \cdot \frac{P}{\sqrt{2}}\right) \cdot P^*\right|^2 +}{2} \\ &\quad + \frac{\left|\left(h_1 \cdot a \cdot \frac{P}{\sqrt{2}} - h_2 \cdot b \cdot \frac{P}{\sqrt{2}}\right) \cdot P^*\right|^2}{2} \\ &= \frac{|h_1 \cdot a + h_2 \cdot b|^2 + |h_1 \cdot a - h_2 \cdot b|^2}{4} \\ &= \frac{(h_1 \cdot a + h_2 \cdot b) \cdot (h_1 \cdot a + h_2 \cdot b)^* + (h_1 \cdot a - h_2 \cdot b) \cdot (h_1 \cdot a - h_2 \cdot b)^*}{4} \\ &= \frac{|h_1|^2 + |h_2|^2 + h_1 \cdot a \cdot h_2^* \cdot b^* + h_2 \cdot b \cdot h_1^* \cdot a^* + |h_1|^2 + |h_2|^2 - h_1 \cdot a \cdot h_2^* \cdot b^* - h_2 \cdot b \cdot h_1^* \cdot a^*}{4} \\ &= \frac{|h_1|^2 + |h_2|^2}{2}\end{aligned}$$

For the above analysis, the RSRP measured by the SUE can actually represent the average power of the two DMRS ports of the MUE, although the SUE does not know that the measured MUE employs two DMRS ports to transmit data. Particularly, the value of the measurement of the RSRP does not have a deviation of 3 dB relative to the true value, therefore, the resource selection based on RSRP can be effectively supported.

DMRS ports can only use two OCCs, for example, OCCs [1,1] and [1,−1] of length 2; in the LTE V2X system, two OCC codes of length 4 are defined, that is, [1,1,1,1] and [1,−1,1,−1]. For the MUE, a specific method to indicate one OCC to be used for one DMRS port (e.g., port 0) and the other OCC to be used for the other DMRS port (e.g., port 1) can be employed. It is assumed that the UE generates a DMRS sequence according to the information X, for example, X is the CRC of the received SA, and the root sequence, CS and OCC of the port 0 are determined according to X, while the above port 1 employs the same root sequence and CS, and uses the other OCC. Or, since an MUE occupies the above two OCCs, the two OCCs can be determined according to the fixed mapping relation of the OCC to DMRS ports. For example, the root sequence and CS of DMRS sequences are determined according to X, and [1,1] is used for DMRS port 0 and [1,–1] is used for DMRS port 1. Or, one of the above two OCCs can be used for one DMRS port (e.g., port 0) and one of the other two OCCs of length 4 can be used for the other DMRS port (e.g., port 1). DMRS ports can actually use four OCCs. The two OCCs and the other two OCCs mentioned above can be mapped one by one. For example, the other DMRS can employ OCC [1,–1,–1,1] to correspond to [1,1,1,1]; the other DMRS can employ OCC [1,1,–1,–1] to correspond to [1, –1, 1, –1]. For example, the root sequence, CS and OCC of the above port 0 is determined according to X. The above port 1 employs the same root sequence and CS and one OCC mapping to the OCC of port 0. In this way, the collision probability with the DMRS sequence of the UE for transmitting data with a single port will not be increased.

For this mechanism of generating DMRS sequences, one method for measuring RSRP is to first measure RSRP in each DMRS symbol in a TU respectively and then to obtain RSRP of the whole TU according to RSRP of each DMRS symbol, for example, the method for processing RSRP of multiple DMRSs is to take the average. In this way, the sequences on one DMRS symbol without considering the influence of OCC are the same according to the same root sequence and CS, for example, the sequences are denoted as $$\frac{P}{\sqrt{2}},$$

wherein the coefficient $$\frac{1}{\sqrt{2}}$$

is used for normalizing the power of the two antenna ports, therefore, the role of OCC is equivalent to pre-code the two antenna ports so as to make them equal to one DMRS port. It is assumed that the OCC elements of the two antenna ports on a DMRS symbol are a and b, respectively, then the pre-coded vector is [a,b]. Since the DMRS sequences of two DMRS ports of the MUE is equivalent to one DMRS port, it is regarded as that the SUE is measuring the RSRP of the above equivalent DMRS port, therefore, the value of the measurement of the RSRP is accurate, that is, the SUE can accurately measure and obtain the total energy of two DMRS ports, so as to effectively support resource selection.

Based on the above analysis, only one DMRS port can be defined when the DMRS is defined based on the data transmission of the two antenna ports. It is assumed that the UE generates the DMRS sequence according to information X, for example, X is a CRC of the received SA, the root sequence and CS of the DMRS port can be determined according to X, then a sequence P is generated according to the root sequence and CS, and for the above each DMRS symbol of the DMRS port, the sequence P is pre-coded respectively. For example, it is assumed that the two OCCs are [1,1,1,1] and [1,–1,1,–1], the pre-coded vectors of the four DMRS symbols are [1,1], [1,–1], [1,1] and [1,–1].

Another method for generating the DMRS sequences of the two DMRS ports of MUE is to distinguish the two ports only according to CS while the root sequence and OCC are the identical. It is assumed that the UE generates the DMRS sequence according to information X, for example, X is a CRC of the received SA, the root sequence, CS and OCC of a DMRS port can be determined firstly according to X, wherein the CS is denoted as cs0, then the other DMRS port employs the same root sequence and OCC, and the CS thereof is determined according to cs0 or X. The CS of the other DMRS port can be equal to cs0 adding with a shift d, that is, the CS of the other port can be (cs0+d) mod 12, for example, d=6, 4, 3, 2. Or, the CS of the other DMRS port can be (cs0 mod 4+8) mod 12. Or, the CS of the other DMRS port can be Ccs0 mod 4, wherein, C={8, 9, 10, 11}, or C={1,5,7,11}. Or, the CS of the other port can be $C_{\lfloor X/2 \rfloor \bmod 4}$, wherein, C={8, 9, 10, 11}, or C={1,5,7,11}. Or, the CS of the other port can be $C_{\lfloor X/16 \rfloor \bmod 4}$, wherein, C={8, 9, 10, 11}, or C={1,5,7,11}. With respect to the present system, the above three methods can increase the number of orthometric DMRS sequences, so as to reduce the possibility of different MUEs selecting a same DMRS sequence.

In the frequency domain, the change of CS has an influence on the phase change on each subcarrier. For example, if the CS intervals are 6, 4, and 3 corresponding to two DMRS ports, the change period of the phase difference between the two DMRS ports is 2, 3, 4. In this way, the phase differences between the two DMRS ports are different on adjacent subcarriers, so RSRP cannot be measured in combination of the adjacent subcarriers. Because the change of the phase difference is periodic, the subcarriers can be divided into k groups according to the interval k, that is, the jth group includes subcarrier j+k·c, wherein, c=0,1, ... ,j=0,1, ... k–1. k is equal to 2, 3, 4, if CS intervals corresponding to two DMRS ports are 6, 4 and 3, thereby RSRP can be measured and averaged separately for each group of subcarriers.

The mechanism for generating a DMRS sequence can be that: RSRP is measured in each DMRS symbol firstly, that is, RSRP are respectively measured and then averaged on the k groups of subcarriers, and then RSRP of multiple DMRS symbols are averaged. Or, RSRP can also be measured on each group of subcarriers of multiple DMRS symbols, and then the RSRP are averaged. Or, since the phases of the two DMRS ports corresponding to the same subcarrier are the same on different DMRS symbols, RSRP can be measured on all the subcarriers jointly with two adjacent DMRS symbols. In this way, the RSRP measured by the SUE can actually represent the average power of the two DMRS ports of the MUE although the SUE does not know that the measured MUE employs two DMRS ports to transmit data. In particular, there is no deviation of 3 dB relative to the true value of the above value of the measurement of the RSRP, so the resource selection based on RSRP can be effectively supported.

A twelfth embodiment is described as follows.

In the LTE V2X system, the randomization of the DMRS sequence and scrambling code of the data channel are achieved by using the CRC field of the SA. The value of the above CRC depends on all the information fields of the SA, that is, as long as a bit changes, regardless of the position of the changed bit, it will lead to the change of CRC. Therefore, CRC can better reflect the difference of SA information of different devices, which is beneficial to randomize the DMRS sequence and scrambling code. However, the same CRC value can be obtained when the SA information varies by more than one bit and the changed bit is consistent with the generator polynomial of CRC, but the probability of this case is relatively small. The UE processes the randomization of the DMRS sequence and the scrambling code according to the information X. X can be the CRC field of the SA, or X can also be an information field (for example, in LTE D2D, a Destination Group ID contained in the SA) contained in the SA for randomization, or X is determined by other methods.

When a UE transmits data by employing a single antenna port, the UE occupies only one of all possible DMRS sequences, and when the UE transmits by employing dual antenna ports, such as a transmit diversity technology, the UE simultaneously occupies two of all possible DMRS sequences. This may possibly result in reducing the randomization effect of DMRS sequences and scrambling codes between UEs. The DMRS sequence can be determined by three parameters, that is, the root sequence, the cyclic shift (CS) and the orthogonal cover code (OCC). For example, it is assumed that a bit of X (for example, X mod 2) is only used for determining OCC but not for determining the root sequence and CS, the above bit of X (X mod 2) cannot randomize DMRS sequences for different UEs, when two DMRS ports of one UE employ two OCCs and employ the same root sequence and CS. In general, it is assumed that if bits in a subset K of the bits of X are changed and all other bits are constant, correspondingly generated multiple DMRS sequences are all used for the same UE, and K can include one or more bits, then the bits in the subset K lose the function of randomizing DMRS sequences of different UEs. In order to ensure the performance of randomness, it is necessary to avoid or minimize the above situations when the DMRS sequence is generated according to X. Preferably, multiple DMRS ports occupied by one UE employ the same root sequence. The method of the present invention is described below according to different combinations of CS and OCC respectively.

The multiple DMRS ports occupied by one UE employ the same CS but different OCCs As shown in FIG. 3, the bits in a subset Y of the X are used for determining OCC (2401), wherein, Y includes one or more bits, meanwhile the bits in the subset Y can be used for determining CS (2402). The DMRS sequences determined according to the subset Y are not completely occupied by a same UE, since Y affects the value of CS and multiple DMRS sequences occupied by one UE must employ the same CS.

For example, a bit X mod 2 of X is used for determining the OCC of the DMRS; bits X mod 2a whose number is a including the bit X mod 2 is for determining the CS of the DMRS, for example, CS is equal to (X mod 2a)mod 12 or ($\lfloor X/2 \rfloor$ mod $2^{a-1}$+X mod 2)mod 12, so that CS is a random selection within the range [0,11], and the change of the bit X mod 2 of X also affect CS, result in the increasing of the randomness of the DMRS; other bits $\lfloor X/2^a \rfloor$ are used for obtaining the sequence shift parameter $f_{ss}=\lfloor X/2^a \rfloor$ mod 30 and fss is used for determining the root sequence of the DMRS. Wherein, a can be configured, preconfigured, or predefined by a base station, for example, a is equal to 8.

For example, the OCC of the DMRS is determined according to one bit X mod 2 of X; bits including bit X mod 2 are used for determining the CS of the DMRS, for example, CS is equal to X mod 12 or ($\lfloor X/2 \rfloor$+X mod 2)mod 12, so that the CS is a random selection within the range [0,11], and the change of bit X mod 2 of X also affect CS, result in the increasing of the randomness of DMRS; the sequence shift parameter is donated as $f_{ss}=\lfloor X/2^y \rfloor$ mod 30. Wherein, y can be configured, preconfigured, or predefined by the base station, for example, y is equal to 4 or 0. For example, the above 16-bit CRC directly replaces the destination group ID for generating the scrambling code.

The multiple DMRS ports occupied by a UE use the same OCC but different CSs

As shown in FIG. 25, the bits of the subset Y of X are used for determining CS (2501), wherein, Y includes one or more bits, meanwhile the bits of Y can also be used for determining OCC (2502). The DMRS sequence determined according to the subset Y is not completely occupied by the same UE, since Y affects the value of OCC and multiple DMRS sequences occupied by one UE must employ the same OCC. In fact, the number of CSs supported by the system can be relatively large, for example, 12 CSs, while one UE occupies only part of CSs, for example, 2 CSs. It is assumed that the bits of a subset z of Y change while the other bits of Y are constant, the generated CSs are completely occupied by the same UE, and the bits of z can also be used for determining the OCCs simultaneously. The DMRS sequence determined according to Y is not completely occupied by the same UE, since z affects the value of OCC and multiple DMRS sequences occupied by one UE must use the same OCC.

For example, it is assumed that the 3 bits $\lfloor X/2 \rfloor$mod 8 of the X denoted as b3, b2, b1 are only used for generating only 8 CSs, that is, 0, 2, 3, 4, 6, 8, 9, 10, wherein the value of b3 determines whether the generated CSs are 0, 2, 3, 4, or 6, 8, 9, 10, in other words, the function of b3 is to generate CS with interval 6. It is assumed that the CS interval of two DMRS ports occupied by one UE is 6, b3 cannot randomize the DMRS sequences of multiple UEs. b3 and the bits X mod 2 of X can be used for generating OCC, for example the OCC is equal to b3+X mod 2. The other bits $\lfloor X/16 \rfloor$ are used for obtaining the sequence shift parameter $f_{ss}=\lfloor X/16 \rfloor$ mod 30.

For example, a bits $\lfloor X/2 \rfloor$ mod $2^a$ of X, denoted as ba, . . . , b3, . . . , b2, . . . , b1, which is used for determining the CS of DMRS, for example, CS is equal to ($\lfloor X/2 \rfloor$ mod $2^a$)mod 12. In this way, no CS generated by one or more bits is completely used for multiple DMRS ports of a UE, so bits $\lfloor X/2 \rfloor$ mod $2^a$ of X can uniquely be used for generating CSs. The bits X mod 2 of X can be used for generating OCC, for example, OCC is equal to X mod 2. The other bits $\lfloor X/2^{a+1} \rfloor$ are used for obtaining the sequence shift parameter $f_{ss}=\lfloor X/2^{a+1} \rfloor$ mod 30. Wherein, a can be configured, preconfigured, or predefined by a base station, for example, a is equal to 7. Or, the bits $\lfloor X/2^y \rfloor$ of X are used for obtaining the sequence shift parameter $f_{ss}=\lfloor X/2^y \rfloor$ mod 30. Wherein, y can be configured, preconfigured, or predefined by a base station, for example, y is equal to 8.

The multiple DMRS ports occupied by a UE employ different OCCs and different CSs The bits of the subset Y of X can only be used for determining CS or for determining the OCC, and Y includes one or more bits. The DMRS sequence determined according to the subset Y is not completely occupied by the same UE, since Y only affects CS or only affects OCC and multiple DMRS sequences occupied by one UE employ different CSs and different OCCs.

For example, one bit X mod 2 of X is used for determining the OCC of the DMRS; 3 bits $\lfloor X/2 \rfloor$ mod 8 are used for determining the CS of the DMRS, wherein, CS can be equal to $\lfloor X/2 \rfloor$ mod 8, or CS can also be eight values within the CS range [0,11] mapped from eight values of $\lfloor X/2 \rfloor$ mod 8, for example, the mapped CSs are as 0, 2, 3, 4, 6, 8, 9, 10 in sequence, or CS is equal to $\lfloor X/2 \rfloor$ mod 12, such that CSs are randomly selected within the range [0,11] result in the increasing of the randomness of DMRS; the sequence shift parameter is denoted as $f_{ss}=\lfloor X/2^y \rfloor$ mod 30. Wherein, y can be configured, preconfigured, or predefined by the base station, for example, y is equal to 4 or 0. Taking the bit X mod 2 as an example, when only the bit X mod 2 changes, the CSs of the generated DMRS sequences are the same, and the OCCs are different. The bit X mod 2 can implement the randomization of DMRS sequences for different UEs, since two DMRS ports occupied by one UE must employ different CSs and different OCCs.

Corresponding to the above method, the present application further discloses a device, which can be used for implementing the above method. As shown in FIG. 26, the device includes a demodulation reference signal (DMRS) generating module and a reference signal received power (RSRP) measuring module, wherein:

the DMRS generating module is configured for detecting scheduling assignments (SAs) of other user equipment (UEs) by a UE in a time unit (TU), generating DMRS sequences of data channels, which are scheduled by the correctly decoded SAs; and the RSRP measuring module is configured for measuring RSRP of the data channels by the UE according to the DMRS sequences.

In a preferred embodiment of the present invention, wherein, if one UE occupies two DMRS ports, the DMRS generating module is configured for generating two DMRS sequences, wherein, root sequences and cyclic shifts (CSs) of the two DMRS sequences are the same, orthogonal cover codes (OCCs) of the two DMRS sequences are different.

In another preferred embodiment of the present invention, wherein, if the DMRS ports use four OCCs, the DMRS generating module is configured for determining a first OCC and applying the first OCC to one DMRS port, and applying a second OCC to the other DMRS port according to cyclic redundancy checks (CRCs) of the SAs, wherein, the second OCC is the OCC which is mapped to the first OCC.

In another preferred embodiment of the present invention, wherein, if the DMRS ports only occupy two OCCs, the DMRS generating module is configured for determining one OCC which is used for one DMRS port and the other OCC which is used for the other DMRS port, according to cyclic redundancy checks (CRCs) of the SAs; or, determining OCCs used for the two DMRS, according to a mapping relation from the OCCs to the DMRS ports.

A person of ordinary skill in the art may understand that all or part of the steps carried in the methods in the foregoing embodiments may be implemented by a program instructing relevant hardware. The program may be stored in a computer-readable storage medium, when executed the program, one of the steps of the method embodiment or a combination thereof is included.

In addition, each of the functional units in the embodiments of the present application may be integrated into one processing module, or each of the units may exist separately physically, or two or more units may be integrated into one module. The above-mentioned integrated module can be implemented in the form of hardware or in the form of software functional module. When the integrated module is implemented in the form of a software function module and is sold or used as an independent product, the integrated module may also be stored in a computer readable storage medium.

The above-mentioned storage medium may be a read only memory, a magnetic disk, an optical disk, or the like.

The above is only the preferred embodiments of the present application and is not intended to limit the present application. Any modifications, equivalent substitutions, improvements, etc. within the spirit and principle of the present application should be included in the scope of protection of the present application.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the disclosure has been described with an exemplary embodiment, various changes and modifications may be suggested to one skilled in the art. It is intended that the disclosure encompass such changes and modifications as fall within the scope of the appended claims.

The invention claimed is:

1. A first terminal in a wireless communication system, the first terminal comprising:
   a transceiver; and
   at least one processor operably coupled to the transceiver, wherein the at least one processor is configured to:
      receive control information on a physical sidelink control channel (PSCCH) for a second terminal, wherein the control information includes information on resources for a physical sidelink shared channel (PSSCH) scheduled by the PSCCH,
identify a reference signal received power (RSRP) of the PSSCH,
identify a resource set for a data transmission based on comparing the RSRP and a threshold, and
transmit data based on the resource set,
wherein the threshold is identified based on a length of a transmission time interval (TTI) of the PSSCH among a plurality of TTIs.

2. The first terminal of claim 1, wherein the at least one processor is further configured to:
divide a long TTI (lTTI) into multiple short TTIs (sTTIs),
set an automatic gain control (AGC) at a beginning of each sTTI, and
set a gap at an end of each sTTI,
wherein a length of the AGC of each sTTI is equal to a length of the AGC of the lTTI and a length of the gap of each sTTI is equal to a length of the gap of the lTTI, or
wherein a length of the AGC of a first sTTI is equal to the length of the AGC of the lTTI, a length of the gap of a last sTTI is equal to the length of the gap of the lTTI, and the length of AGC or gap of each of other sTTIs is shorter than the length of the AGC or the gap of the lTTI, or
wherein lengths of the AGC and the gap of each of other sTTIs are shorter than lengths of the AGC and the gap of the lTTI respectively.

3. The first terminal of claim 2, wherein the at least one processor is further configured to:
based on a number of scheduling assignments (SAs) that can be sensed by the second terminal being smaller than a total number of SAs of multiple TTIs with different lengths in a lTTI, determine to-be-sensed SA resources according to priorities of the TTIs with different lengths, and
based on the number of SAs that can be sensed by the second terminal being smaller than the total number of SAs of multiple TTIs with different lengths in the lTTI, determine a number of SA resources of lTTI to be sensed by the second terminal and a number of SA resources of sTTI to be sensed by the second terminal respectively.

4. A method performed by a first terminal, the method comprising:
receiving control information on a physical sidelink control channel (PSCCH) for a second terminal, wherein the control information includes information on resources for a physical sidelink shared channel (PSSCH) scheduled by the PSCCH;
identifying a reference signal received power (RSRP) of the PSSCH;
identifying a resource set for a data transmission based on a comparison of the RSRP and a threshold; and
transmitting data based on the resource set,
wherein the threshold is identified based on a length of a transmission time interval (TTI) of the PSSCH among a plurality of TTIs.

5. The method of claim 4, further comprising:
dividing a long TTI (lTTI) into multiple short TTIs (sTTIs);
setting an automatic gain control (AGC) at a beginning of each sTTI; and
setting a gap at an end of each sTTI,
wherein a length of the AGC of each sTTI is equal to a length of the AGC of the lTTI and a length of the gap of each sTTI is equal to a length of the gap of the lTTI, or
wherein a length of the AGC of a first sTTI is equal to the length of the AGC of the lTTI, a length of the gap of a last sTTI is equal to the length of the gap of the lTTI, and the length of AGC or gap of each of other sTTIs is shorter than the length of the AGC or the gap of the lTTI, or
wherein lengths of the AGC and the gap of each of other sTTIs are shorter than lengths of the AGC and the gap of the lTTI respectively.

6. The method of claim 5, wherein determining of resources for data transmission comprises:
based on a number of scheduling assignments (SAs that can be sensed by the second terminal being smaller than a total number of SAs of multiple TTIs with different lengths in a lTTI, determining to-be-sensed SA resources according to priorities of the TTIs with different lengths; and
based on the number of SAs that can be sensed by the second terminal being smaller than the total number of SAs of multiple TTIs with different lengths in the lTTI, determining a number of SA resources of lTTI to be sensed by the second terminal and a number of SA resources of sTTI to be sensed by the second terminal respectively.

7. The first terminal of claim 1,
wherein, based on the RSRP of the PSSCH is less than or equal to the threshold, the resource set for the data transmission includes the resources for the PSSCH,
wherein, based on the RSRP of the PSSCH is more than the threshold, the resource set for the data transmission excludes the resources for the PSSCH.

8. The first terminal of claim 1,
wherein the data is transmitted on a subset of the resource set,
wherein the subset is identified based on a length of a TTI for the data transmission.

9. The first terminal of claim 1,
wherein the control information is received based on lengths of the plurality of TTIs.

10. The method of claim 4,
wherein, based on the RSRP of the PSSCH is less than or equal to the threshold, the resource set for the data transmission includes the resources for the PSSCH, and
wherein, based on the RSRP of the PSSCH is more than the threshold, the resource set for the data transmission excludes the resources for the PSSCH.

11. The method of claim 4,
wherein the data is transmitted on a subset of the resource set, and
wherein the subset is identified based on a length of a TTI for the data transmission.

12. The method of claim 4,
wherein the control information is received based on lengths of the plurality of TTIs.

* * * * *